(12) United States Patent
Zöller

(10) Patent No.: US 10,828,585 B2
(45) Date of Patent: Nov. 10, 2020

(54) LIQUID TREATMENT APPARATUS WITH REPLACEABLE TREATMENT CARTRIDGE AND CARTRIDGE CONNECTION SYSTEM

(71) Applicant: BRITA GmbH, Taunusstein (DE)

(72) Inventor: Jochen Zöller, Nastätten (DE)

(73) Assignee: BRITA GmbH, Taunusstein (DE)

( * ) Notice: Subject to any disclaimer, the term of this patent is extended or adjusted under 35 U.S.C. 154(b) by 66 days.

(21) Appl. No.: 15/565,142

(22) PCT Filed: Apr. 8, 2016

(86) PCT No.: PCT/EP2016/057741
§ 371 (c)(1),
(2) Date: Oct. 6, 2017

(87) PCT Pub. No.: WO2016/162475
PCT Pub. Date: Oct. 13, 2016

(65) Prior Publication Data
US 2018/0104627 A1    Apr. 19, 2018

(30) Foreign Application Priority Data

Apr. 9, 2015 (EP) .................................... 15162963

(51) Int. Cl.
*B01D 15/36* (2006.01)
*B01D 35/30* (2006.01)
(Continued)

(52) U.S. Cl.
CPC ......... *B01D 35/306* (2013.01); *B01D 15/362* (2013.01); *B01D 61/10* (2013.01);
(Continued)

(58) Field of Classification Search
CPC combination set(s) only.
See application file for complete search history.

(56) References Cited

U.S. PATENT DOCUMENTS 4,915,831 A    4/1990  Taylor
7,163,237 B2 *  1/2007  Niermeyer ............. B01D 35/26
                                                          285/26

(Continued)

OTHER PUBLICATIONS

International Preliminary Report on Patentability as received in PCT/EP2016/057741 dated Oct. 19, 2017.

*Primary Examiner* — Bobby Ramdhanie
*Assistant Examiner* — Michael J An
(74) *Attorney, Agent, or Firm* — Keller Jolley Preece

(57) ABSTRACT

A device for forming a liquid treatment apparatus includes a main part; and a receiving part including a cavity for receiving a connecting head of a replaceable liquid treatment cartridge having at least one port in liquid communication with an interior of the liquid treatment cartridge such that the at least one port(s) of the connecting head are in sealed liquid communication with corresponding ports of the receiving part. The receiving part is journalled for movement between a first and a second position with respect to the main part whilst the connecting head is inserted in the cavity. The head is insertable into and retractable from the cavity in the first position. The liquid treatment cartridge is lockable to the device by at least moving the receiving part with the inserted connecting head into the second position.

18 Claims, 25 Drawing Sheets

(51) Int. Cl.
  *B01D 61/10*   (2006.01)
  *B01D 61/20*   (2006.01)
  *C02F 1/28*    (2006.01)
  *C02F 1/44*    (2006.01)
  *B01D 65/00*   (2006.01)
  *C02F 1/42*    (2006.01)

(52) U.S. Cl.
  CPC .............. *B01D 61/20* (2013.01); *B01D 65/00* (2013.01); *C02F 1/283* (2013.01); *C02F 1/44* (2013.01); *B01D 2201/301* (2013.01); *B01D 2201/36* (2013.01); *B01D 2313/20* (2013.01); *C02F 2001/425* (2013.01); *C02F 2201/004* (2013.01); *C02F 2201/006* (2013.01); *C02F 2301/043* (2013.01)

(56) References Cited

U.S. PATENT DOCUMENTS

| | | | |
|---|---|---|---|
| 7,438,811 B2 * | 10/2008 | Lin | B01D 35/303 210/232 |
| 8,097,158 B2 * | 1/2012 | Tubby | B01D 27/08 210/235 |
| 2005/0167352 A1 | 8/2005 | Burrows et al. | |
| 2009/0236271 A1 * | 9/2009 | Eserkaln | C02F 9/005 210/137 |
| 2011/0139698 A1 | 6/2011 | Freystedt et al. | |
| 2011/0247974 A1 * | 10/2011 | Gale | B01D 35/30 210/238 |
| 2014/0374336 A1 | 12/2014 | Sherman et al. | |
| 2016/0136547 A1 * | 5/2016 | Nuss | B01D 35/1435 210/91 |

\* cited by examiner

LIQUID TREATMENT APPARATUS WITH REPLACEABLE TREATMENT CARTRIDGE AND CARTRIDGE CONNECTION SYSTEM

CROSS-REFERENCE TO RELATED APPLICATIONS

This application is a national phase entry under 35 U.S.C. § 371 of International Application No. PCT/EP2016/057741, filed Apr. 8, 2016 which claims the benefit of European Application No. 15162963.1, filed Apr. 9, 2015. The entire contents of each of the foregoing patent applications are hereby incorporated by reference.

SUMMARY

The invention relates to a device for forming a liquid treatment apparatus, including:
a main part; and
a receiving part including a cavity for receiving a connecting head of a replaceable liquid treatment cartridge having at least one port in liquid communication with an interior of the liquid treatment cartridge such that the at least one port(s) of the connecting head are in sealed liquid communication with corresponding ports of the receiving part,
wherein the receiving part is journalled for movement between a first and a second position with respect to the main part whilst the connecting head is inserted in the cavity,
wherein the connecting head is insertable into and retractable from the cavity in the first position,
wherein the liquid treatment cartridge is lockable to the device by at least moving the receiving part with the inserted connecting head into the second position, and
wherein the movement includes a component corresponding to an intrinsic rotation in a plane parallel to a direction of insertion.

The invention also relates to a liquid treatment apparatus. The invention also relates to a liquid treatment cartridge.

The invention also relates to a method of attaching a replaceable liquid treatment cartridge to a head part of a liquid treatment apparatus,
the head part including at least one device including:
a main part; and
a receiving part including at least one cavity,
the liquid treatment cartridge including a connecting head having at least one port in liquid communication with an interior of the liquid treatment cartridge, the method including:
inserting the connecting head into the cavity such that the at least one port(s) of the connecting head are in sealed liquid communication with corresponding ports of the receiving part,
wherein the connecting head is inserted in a first position of the receiving part with respect to the main part, and
moving the receiving part with the inserted connecting head into a second position with respect to the main part by at least swiveling the liquid treatment cartridge.

EP2 366 442 A1 discloses a water purifying filter assembly module including a filter assembly head and a module body. The filter assembly head may have a water purifying filter assembled on one side thereof. The filter assembly head is rotatable in the module body. A movement guide portion is formed on the module body so that a guide protrusion formed on the water purifying filter moves along the movement guide portion while being inserted therein. The movement guide portion forms a curve connecting a release position of the guide protrusion inside the module body at which the water purifying filter is released from the filter assembly head and an assembly position of the guide protrusion inside the module body at which the water purifying filter is assembled thereon. Also a distance between a rotation centre of the filter assembly head and the release position is larger than a distance between the rotation centre of the filter assembly head and the assembly position of the movement guide portion.

A part such as the module body is generally connected more or less permanently to water conduits, usually being fixed to a wall along which the conduits run. The height is often just about sufficient to provide space for the filter cartridge, which generally depends from the device. Several arrangements, often closely spaced together, may be provided along the wall, e.g. where different types of filter cartridge are to be used to treat water in different ways consecutively or where the cartridge implements a pre- or post-treatment of water subjected to membrane filtration. To replace the known filter, it is swiveled away from the wall to rotate the filter assembly head over about 90°. Thus, a user or service technician can grab hold of it without being hindered by adjacent filters or devices. However, there must be space to step back as the filter is swiveled over such a relatively large angle. Also, the movement guide portion provides little support to the filter when the guide protrusion is close to the release position, because the filter is almost horizontal at that stage. Furthermore, the module body must have a relatively large height to provide sufficient space for the assembly head and the inserted part of the water filter to rotate over 90° within it.

US 2014/0374336 A1 discloses a water filtration system including a filter cartridge assembly. A replaceable filter is the assembly that a user will replace as required. This assembly includes a filter cap. An ingress port and an egress port extend from the filter cap and are in fluid communication with each other as well as with a manifold. The manifold is rotatable with respect to a left mounting bracket and a right mounting bracket about left and right pivot bosses that rotatably mate with the mounting brackets. The pivot bosses are preferably supported by pivot boss receivers, preferably cylindrical depressions in the mounting brackets. In an alternative embodiment, the pivot bosses may be replaced with at least one pivot pin, and the pivot boss receivers may be replaced with apertures or through-holes. With the filter cartridge assembly directly secured to the manifold, the design allows the user to simply lift the cartridge up, away from the vertical, which pivots the manifold about the pivot bosses.

Because the movement is again limited to pivoting movement, the cartridge must be lifted up a relatively long way by rotating it and the manifold over a relatively large angle to move it sufficiently far away from a wall to which the mounting brackets are mounted.

It is an object of the invention to provide a device, liquid treatment apparatus, cartridge and method that allow for easy handling of the cartridge when replacing it without having to rotate the receiving part with the inserted connecting head of the cartridge over a very large angle.

This object is achieved by the device according to the invention, which is characterised in that the movement further includes at least a component corresponding to a displacement of the receiving part relative to the main part.

The main part of the device may be fixed in position more or less permanently, e.g. being supported on a wall. Similar parts or other liquid treatment devices may be positioned immediately adjacently. The receiving part includes a cavity for receiving a connecting head of a replaceable liquid treatment cartridge having at least one port in liquid communication with an interior of the liquid treatment cartridge such that the at least one port(s) of the connecting head are in sealed liquid communication with corresponding ports of the receiving part. Thus, liquid can be transferred between the replaceable cartridge and the device to allow the former to effect a particular type of liquid treatment. The receiving part may have only one such cavity or multiple cavities for receiving respective connecting heads, e.g. multiple protruding connecting heads at one end of the liquid treatment cartridge that each provide only one port. The treatment in the liquid treatment cartridge may rely on the use of exhaustible media. Regeneration or replenishment of such liquid treatment media on-site is not required, because the liquid treatment cartridge is replaceable. The receiving part is journalled for movement between a first and a second position with respect to the main part whilst the connecting head is inserted in the cavity. Thus, the main part can remain fixed in position, whereas the receiving part is able to move with the cartridge. The cartridge is at least partly supported, and thus guided, between a locked position and a position in which it is releasable. Thus, the liquid treatment cartridge is lockable to the device by at least moving the receiving part with the inserted connecting head into the second position. Further actions may be required for completely effecting the lock. Because the movement of the receiving part includes a component corresponding to an intrinsic rotation of the receiving part in a plane of rotation generally parallel to the about an axis tied to the receiving part and perpendicular to the direction of insertion, the cartridge can, for example, be situated below the device in the second position with relatively little clearance between it and the ground, yet still be retracted. Furthermore, the device can be placed in a row with other devices at a relatively small distance. A typical example would be where the device is part of a multi-head apparatus. A user or service technician is still able to grab hold of the cartridge to insert or retract it, because the rotation causes the filter to swivel out of the row. The rotation is not about an axis of rotation fixed in position relative to the main part. Rather, the movement further includes at least a component corresponding to a displacement of the entire receiving part, and thus of the axis of (intrinsic) rotation. The displacement is in a direction generally parallel to the plane of rotation. Each part of the body forming the receiving part is displaced relative to the main part. The movement is thus a combination of a shift in position of the receiving part relative to the main part and a rotation thereof. Because of this, the angle of rotation between the first and second position need not be quite so large to achieve sufficient clearance of the cartridge from the ground and any adjacent devices. The displacement may be, but need not be, along a straight path. It may, for example, be along a curvilinear path. The displacement and the rotation may be sequential between the first and second position, e.g. rotation in the second position followed by displacement into the first position or vice versa.

The angle of rotation between the first position and the second position may have a value below 20°, e.g. below 15°, for example 10°.

This value is relatively low. In particular where the main part includes a housing accommodating the receiving part, the housing can have a relatively low height. It need not afford a large amount of space in which the receiving part swings between the first and second positions.

In an embodiment, wherein the receiving part has an axis corresponding to a direction of insertion, the displacement is in a direction parallel to the plane of rotation and having at least a component perpendicular to the axis as oriented in the second position.

In the second position, the cartridge may be aligned with a row of adjacent devices or situated in a recess. Displacement perpendicular to the axis as oriented in the second position will move it out of the row or recess. The axis corresponding to the direction of insertion will generally be aligned with a body axis of the cartridge when the connecting head has been inserted into the receiving part. This will usually be a longitudinal axis of the cartridge, except in case of very squat cartridges. It will in any case be a body axis extending from the end of the cartridge at which the connecting head is provided to an opposite end of the cartridge. The orientation of the axis in the second position will generally be vertical or at an acute angle to the vertical, with the cartridge depending from the device. The intrinsic rotation already swivels the cartridge into a position in which its lower end is sufficiently clear of the ground. It is therefore convenient if the component perpendicular to the axis as oriented in the second position is a major component of the direction of displacement or corresponds to the direction of displacement. An operator can then hold the cartridge at a point relatively close to the connecting head and thus to the device. Furthermore, where the main part includes a housing, the height of the housing need not be very large. The overall height of the assembly of device and cartridge in the second position is thus also smaller.

In an embodiment, the main part includes at least one of at least one inlet and at least one outlet, at least one of which is placeable in liquid communication with at least one respective one of the ports of the receiving part in at least the second position.

Thus, the receiving part need not be provided with a flexible connector to an adjacent device or conduit. This also allows it to be situated in a housing of the main device, since it need not be accessible for connection to conduits delivering liquid to be treated or carrying treated liquid to a connected appliance. Instead, a rigid connection between such a conduit and the inlet and/or outlet of the main part can be provided.

A variant of this embodiment includes a valve mechanism for interrupting the liquid communication in at least the first position.

Thus, leaks when the connecting head is not fully inserted can be avoided.

In particular variant, the receiving part is arranged to function as a movable valve member of the valve mechanism, wherein at least one, e.g. all of ports of the receiving part in liquid communication with the cavity are aligned in the second position with respective ports of the main part that are each at least placeable in liquid communication with one of the at least one inlets and outlets, and wherein the ports of at least one of the receiving part and the main part aligned in the second position are blocked by a wall of the other of the receiving part and the main part in the first position.

This is a relatively simple valve mechanism construction that also avoids that a user forgets to actuate the valve mechanism so as to interrupt the liquid communication in at least the first position. Instead, movement of the cartridge with the receiving part automatically closes and opens the valve mechanism in the right positions. Because the receiving part functions as a movable valve member, complicated linkages between the receiving part and a separate movable valve member are not required.

In a particular variant, a channel is formed in the receiving part, wherein the channel is arranged, in at least the first position, to place at least one of the ports of the main part aligned with a respective port of the receiving part in the second position in sealed liquid communication with at least one other of the ports of the main part aligned with a respective port of the receiving part in the second position.

In this variant, the cartridge can be removed without interrupting the flow of liquid between at least one inlet and at least one outlet of the main part. This can be useful where the device is one of a number placed in a row for sequentially treating a liquid. It may be that the particular treatment effected by the removed cartridge is not required. It is then not necessary to remove the device from the row.

In an embodiment, in which the main part includes at least one of at least one inlet and at least one outlet, at least one of which is placeable in liquid communication with at least one respective one of the ports of the receiving part in at least the second position, the main part includes at least one inlet and at least one outlet, and at least one inlet and at least one outlet is placeable in liquid communication with at least one respective one of the ports of the receiving part in at least the second position.

This device is thus intended for use with cartridges having a connecting head with at least one inlet port for liquid to be treated and at least one outlet port for treated liquid. The inlet port and the outlet port are at the same end, rather than being at opposite ends. The cartridge can therefore be closed at the opposite end to the end at which the connecting device is provided. It will contain a fall tube or a riser tube to allow the liquid to return to the connecting head upon treatment. From the point of view of the device, all that matters is that the connecting head fit the cavity. Assuming the cartridge has a longitudinal axis aligned with the direction of insertion into the cavity, it may have any length.

In an embodiment, the receiving part has at least three ports placeable in sealed liquid communication with corresponding ports of the connecting head by inserting the connecting head into the cavity.

This device is able to accommodate liquid treatment cartridges with a bypass such as are commonly used in softening or reducing the carbonate hardness of water. Such cartridges have a certain liquid treatment part and a flow path from an inlet port to an outlet port that bypasses the certain liquid treatment part. The certain liquid treatment part is typically a liquid treatment part including at least a liquid treatment medium for the treatment of liquid by ion exchange. An example is a bed of cation exchange resin, for example weakly acidic cation exchange resin, which may be at least in part in the hydrogen form. Where two inlet ports are provided, one is for conducting liquid along a flow path through the certain liquid treatment part and one for conducting it along the bypass flow path. The flow paths join in the cartridge downstream of the certain liquid treatment part. The volumetric flow rate ratio of the two sub-flows determines the properties of the mix, e.g. the hardness or carbonate hardness, assuming that the sub-flow led along the bypass flow path is treated differently or to a different extent compared with the sub-flow led through the certain liquid treatment part.

This device may also or alternatively be able to accommodate cartridges for implementing a form of mechanical filtration in cross-flow mode. Such a cartridge requires at least one inlet and separate outlets for filtrate and retentate.

In a particular embodiment, the receiving part has at least four ports placeable in sealed liquid communication with corresponding ports of the connecting head by inserting the connecting head into the cavity.

This allows the use of a high-throughput liquid treatment cartridge. It may still have a relatively compact connecting head, with the ports having a regular, e.g. circular, shape and being placed adjacent to each other. Where the cartridge is a cartridge with a bypass, the rate of flow is not limited by the fact that there is only a single inlet port but two outlet ports or a single outlet port in combination with two inlet ports. Where the cartridge is, for example, a reverse osmosis or other cross-flow membrane filtration cartridge, there can be two inlet ports in addition to an outlet port for retentate and an outlet port for filtrate. Again, the inlet port does not limit the throughput.

In an embodiment, the cavity tapers in the direction of insertion.

In this embodiment, insertion and retraction of the connecting head into and out of the cavity is facilitated. The taper is such that at least one lateral dimension of the cavity is larger at a mouth of the cavity than at an opposite end. Damage to sealing elements provided around ports of the receiving part or ports of the connecting head during insertion or retraction is then largely avoided, because contact is only established in positions close to and including the fully inserted position.

In an embodiment, at least one, e.g. all, of the ports of the receiving part are in respective sections of at least one wall having a surface at least partly delimiting the cavity laterally with respect to an axis corresponding to the direction of insertion.

The ports of the receiving part are thus located in side walls of the cavity, around a central axis of the cavity corresponding to the direction of insertion. This avoids the need for complicated coaxial ports at an axial end of the cavity and for similarly complicated coaxial ports at an axial end of the liquid treatment cartridge. Furthermore, the ports can have a relatively large cross-sectional area. Where the receiving part functions as a movable valve member, the displacement of the ports between the first and second position is also larger than would be the case if they were provided in an axial end wall of the cavity.

In a variant of this embodiment, at least two ports of the receiving part are in respective side wall sections on opposite sides of the cavity.

The ports can thus be relatively large even if the receiving part is relatively compact, because they are not placed adjacent one another in one side wall. Where the receiving part functions as a movable valve member, it is easier to ensure that the valve is closed in the first position than would be the case if two ports were to be situated adjacent each other in one side wall section.

In an embodiment of the device, the receiving part includes at least one groove for receiving at least one alignment part on the connecting head when the connecting head is inserted into the cavity, wherein the groove is provided in a section of a wall having a surface at least partly delimiting the cavity laterally with respect to an axis corresponding to the direction of insertion.

This facilitates insertion of the connecting head into the cavity in the first position.

In a variant of this embodiment, the receiving part includes at least one further groove for receiving at least one further alignment part on the connecting head when the connecting head is inserted into the cavity, wherein the at least one further groove is provided in a section of a wall having a surface at least partly delimiting the cavity laterally with respect to a central axis corresponding to the direction of insertion, and wherein the at least one further groove is at a different azimuthal position with respect to the central axis.

This ensures that the cartridge is inserted with the correct orientation about a cartridge axis to be aligned with the direction of insertion. It is of particular use when the cavity and connecting head taper, because the alignment part and groove can then engage before the connecting head contacts the surfaces of the side walls or the receiving part defining the cavity.

In an embodiment in which the receiving part includes at least one groove for receiving at least one alignment part on the connecting head when the connecting head is inserted into the cavity, wherein the groove is provided in a section of a wall having a surface at least partly delimiting the cavity laterally with respect to an axis corresponding to the direction of insertion, at least one of the grooves includes a stop for limiting movement of the at least one alignment part in the groove.

The connecting head may otherwise be inserted too far and jam or, especially if it tapers, cause too much pressure to be exerted on sealing elements that provide the sealed liquid communication between the cartridge ports and the ports of the receiving part that are in liquid communication with the cavity.

In an embodiment in which the receiving part includes at least one groove for receiving at least one alignment part on the connecting head when the connecting head is inserted into the cavity, wherein the groove is provided in a section of a wall having a surface at least partly delimiting the cavity laterally with respect to an axis corresponding to the direction of insertion, at least an end section of at least one of the grooves proximal to a mouth of the cavity is formed by a slit through a side wall section of the receiving part.

In this variant, an alignment part or part of an alignment part can project through the wall and be supported by a support surface provided by a section of the main device, for example. It is also allows a groove to be provided without the need for an unnecessarily thick receiving part wall.

In an embodiment, the main part includes a housing defining a housing cavity in which the receiving part is movably journalled.

The movement of the receiving part cannot be obstructed by foreign objects in this embodiment.

A variant includes at least one, e.g. at least two, screening parts, journalled for movement with the receiving part, for closing a respective section of a mouth of the housing cavity adjacent a section occupied by the receiving part in at least one of the first and second positions.

The housing cavity will have a much larger mouth than the cavity of the receiving part, because the cartridge must be able to move with the receiving part when its connecting head is inserted in the cavity. Without the screening part or parts there might be space to insert foreign objects into the housing cavity between an edge of its mouth and the receiving part.

In an embodiment, the receiving part is journalled by protrusions guided in guides for receiving the protrusions.

This is a relatively simple way of enabling the receiving part to carry out a relatively complicated movement combining displacement of the entire receiving part relative to the main part with an intrinsic rotation of the receiving part. A guide may include at least one of a gate and a groove for guiding an inserted protrusion. The guide may be defined by a single component or an assembly of components.

In an embodiment in which the receiving part is journalled by protrusions guided in guides for receiving the protrusions, the protrusions are provided on the receiving part.

The main part thus includes the component or assembly of components defining the guides (gates and/or grooves). The receiving part is relatively small and must provide room for ports. Due to the arrangement of this embodiment, the receiving part need not be provided with grooves adjacent the ports. The main part is larger anyway, because it must accommodate the receiving part so that the receiving part is free to move.

In an embodiment in which the receiving part is journalled by protrusions guided in guides for receiving the protrusions, each protrusion projects in a respective direction generally perpendicular to the plane of rotation.

This allows for movement in a plane parallel to the plane of rotation.

In an embodiment in which the receiving part is journalled by protrusions guided in guides for receiving the protrusions, at least one pair of a protrusion and guide is provided on each of opposite sides of a central plane parallel to the plane of rotation.

The central plane passes through the middle of the receiving part. The receiving part is suspended by the protrusions, e.g. in a cavity of a housing of the main part. By providing at least one pair of a protrusion and guide on each of opposite sides of a central plane, the axis of rotation is correctly oriented.

In an embodiment in which the receiving part is journalled by protrusions guided in guides for receiving the protrusions, projections of at least two protrusions onto the central plane are at different locations.

It is thus possible to guide the degree of rotation during the movement of the receiving part. A single protrusion or a pair of aligned protrusions on opposite sides of the receiving part might allow for uncontrolled rotation.

In an embodiment in which the receiving part is journalled by protrusions guided in guides for receiving the protrusions, at least one of the guides, e.g. a pair of guides provided on opposite sides of a central plane parallel to the plane of rotation, has opposite edges for guiding a protrusion between the first and second positions, wherein the opposite edges have at least central sections with different respective curvatures.

This embodiment addresses the problem that a user will not generally be able to manipulate the cartridge such that a force on the receiving part directed exactly parallel to the locus of intended movement of the protrusion is exerted. There is thus a risk of jamming, especially in an embodiment in which projections of at least two protrusions onto the central plane are at different locations, e.g. if there are two protrusions guided in respective guides on each side of the receiving part. Due to the differing curvatures, the guides can be wider in a central section than at their ends. When the receiving part is initially moved out of one of the first and second positions, the protrusion in that groove is guided by only one of the opposing edges, this being a different edge on the way out of the first position than on the way out of the second position. Due to the differing curvatures, the end positions can be defined relatively well, but there can be play along the path provided for the protrusions between the first and second positions.

In an embodiment of the device, the main part includes at least one section defining a support surface for supporting a protruding part of the liquid treatment cartridge during movement of the receiving part between the first and second positions with the connecting head inserted.

This addresses the problem that it is difficult to guide the movement of the receiving part or to provide adequate journaling of the receiving part if the full weight of the liquid treatment cartridge acts on the receiving part between the first and second positions. In this embodiment, there is a separation of functions. The support surface or surfaces provide support for the protruding part and function as fulcrum for changing the orientation of the cartridge as its connecting head is guided by the receiving part. To provide balanced support, at least a pair of sections defining a respective support surface for supporting a respective protruding part of the liquid treatment cartridge during movement of the receiving part between the first and second positions with the connecting head inserted may be provided on either side of a plane parallel to the plane of rotation.

In an embodiment of the device in which the main part includes at least one section defining a support surface for supporting a protruding part of the liquid treatment cartridge during movement of the receiving part between the first and second positions with the connecting head inserted, the receiving part has an axis corresponding to a direction of insertion, and an axial distance of the support surface of at least one of the sections to an axial end of the cavity distal to a mouth of the cavity decreases towards the second position over at least a section of the support surface.

The support surface or surfaces thus act on the protrusion contacting the surface concerned so as to urge the connecting head into the cavity during at least part of the movement from the first to the second position. The liquid treatment cartridge acts as a lever, so that the force required for sufficient insertion is relatively low.

In an embodiment in which the main part includes at least one section defining a support surface for supporting a protruding part of the liquid treatment cartridge during movement of the receiving part between the first and second positions with the connecting head inserted, at least one of the sections defines at least one detent for the protruding part of the liquid treatment cartridge.

The detent is suitable for holding the receiving part in the second position with the cartridge inserted, so that neither the receiving part nor the cartridge is easily knocked out of the second position. Rather, a deliberate force exerted on the cartridge is required to release the receiving part from the second position.

An embodiment further includes at least one latching device for retaining the receiving part in the first position.

This serves to ensure that the connecting head is able to enter the cavity in the first position. Since it can be retracted in the first position, keeping the receiving part in the first position after the connecting head has been retracted allows the next cartridge to be inserted without any difficulty.

In a variant of this embodiment, the latching device includes a resilient part for returning it to a configuration for retaining the receiving part in the first position, and the latching device is arranged to be urged out of the configuration through engagement by the receiving part as it moves into the first position.

This allows the user to operate the latch without having to let go of the cartridge to be replaced as the receiving part is moved from the first to the second position. The receiving part is automatically locked in position without the need to actuate the latch separately.

In an embodiment in which the device includes at least one latching device for retaining the receiving part in the first position, the latching device includes a part for engagement by the cartridge on insertion of the connecting head into the cavity, such that the latch device releases the receiving part.

This allows the user to cause the receiving part to be released without having to let go of the replacement cartridge as it is inserted. It can be inserted with both hands. The mere act of inserting it releases the receiving part for movement into the second position. There can be a relatively strong shape-lock between the latching device and the receiving part in the first position in the absence of a cartridge with a connecting head inserted into the cavity.

In an embodiment in which the device includes at least one latching device for retaining the receiving part in the first position, the latching device includes at least one resilient arm having a free end arranged to flex in a direction transverse to the plane of rotation on engagement with at least one of the receiving part and the cartridge, e.g. a U-shaped part having arms arranged on opposite sides of the receiving part in the first position.

This is a relatively simple construction in which a section of the resilient arm engages the receiving part directly and a section provides the resilient force for urging the engaging section into the configuration in which it does so. There are even fewer parts if the latching device includes a U-shaped part having arms arranged on opposite sides of the receiving part in the first position. The free ends of the arms are urged apart in opposite directions and snap back into place when the receiving part is moved into the first position. Strong anchoring of the relatively immobile ends of the arms to the remainder of the main part of the device is not required. Rather, the U-shaped part can be an insert or inlay.

In a variant of this embodiment, the arm includes a section, e.g. a pawl at the free end, having a facet for engagement by the cartridge facing at least in part in a direction opposite to the direction of insertion.

The facet may in particular face only in part in a direction opposite to the direction of insertion. The cartridge thus engages this facet to urge the arm out of the position of engagement with the receiving part. The same or a further section may have a further facet facing at least, e.g. only, in part in a direction parallel to the plane of rotation for engaging the receiving part as it moves into the first position. An opposite surface for latching to the receiving part may face predominantly or only in an opposite direction parallel to the plane of rotation in that case. Such slanting facets function as inclined planes to move the arm out of engagement with the receiving part on exertion of a relatively small force. The opposite surface for latching to the receiving part, on the other hand, provides a relatively strong shape-lock.

In an embodiment of the device in which the receiving part includes at least one groove for receiving at least one alignment part on the connecting head when the connecting head is inserted into the cavity, the groove is provided in a section of a wall having a surface at least partly delimiting the cavity laterally with respect to an axis corresponding to the direction of insertion, at least an end section of at least one of the grooves proximal to a mouth of the cavity is formed by a slit through a side wall section of the receiving part and the device includes at least one latching device for retaining the receiving part in the first position, the latching device is arranged to engage the slit.

In this embodiment, the alignment part can move the latching device out of the configuration in which the latching device holds the receiving part in the first position as the connecting head is inserted into the cavity. In an embodiment of the device, the main part includes at least one section defining a guide surface facing mainly in a same direction as a mouth of the cavity of the receiving part for guiding a projecting part of the liquid treatment cartridge during at least part of movement of the receiving part from the second to the first position, the receiving part has an axis corresponding to a direction of insertion, and an axial distance of the support surface of at least one of the sections to an axial end of the cavity distal to a mouth of the cavity increases towards the first position over at least a section of the support surface.

The connecting head may become somewhat stuck in the cavity over the course of a long period of use in the second position. In this embodiment, the connecting head is urged out of the cavity as the receiving part moves back into the first position from the second position. The user need not therefore exert such a large force to retract the connecting head.

An embodiment of the device is provided with a part for mounting the main part to a wall, wherein the direction of displacement has at least a component perpendicular to the wall.

Further devices may be placed relatively close to the device on the same wall, or the mounting part may be used to mount the device on the back wall of a recess. The cartridge is not only swiveled away from the wall at one end but also moved away from the wall at the end closest to the device.

According to another aspect, the liquid treatment apparatus according to the invention includes a replaceable liquid treatment cartridge and a head part including at least one device according to the invention.

In an embodiment of the apparatus at least two, e.g. three or four, liquid-permeable ports in liquid communication with the interior of the liquid treatment cartridge are provided in the connecting head.

With at least two ports, there need not be any ports at an opposite end of the liquid treatment cartridge to the one at which the connecting head is provided. Compared with a throughflow cartridge, there is no need to align the cartridge with a further head part to allow it to reach the second position. All the ports required for operation of the liquid treatment cartridge to effect the treatment are at one end of the cartridge. With at least three ports, a bypass through the cartridge can be implemented. Alternatively, the cartridge may include a membrane module for operation in cross-flow mode. With at least fourth ports, the rate of flow through the cartridge is less likely to be restricted, because there can be an equal number of inlet and outlet ports.

In an embodiment of the liquid treatment apparatus, wherein the liquid treatment cartridge has a cartridge axis, essentially aligned with the direction of insertion when the connecting head is inserted in the cavity, at least one, e.g. all, of the ports in liquid communication with the interior of the liquid treatment cartridge is provided in respective surface sections facing in directions at an angle to the cartridge axis.

The angle will generally be at least 45°. In effect, the ports are in side surfaces of the connecting head, rather than an axial end surface. They can thus be larger without having to increase the width of the connecting head. Where there are two or more ports, they need not be arranged concentrically.

In an embodiment of the liquid treatment apparatus, at least one, e.g. all, of the ports in liquid communication with the interior of the liquid treatment cartridge is provided in an essentially planar respective surface section of the connecting head.

Sealing elements will generally be required to provide the sealed liquid communication between the ports in the connecting head and those of the receiving part. These are either provided around the cartridge ports and pressed against a surface delimiting the cavity or around the receiving part ports and pressed against the essentially planar surface sections. In either case, the degree of compression is relatively uniform along the sealing element.

In an embodiment, wherein the liquid treatment cartridge has a cartridge axis, essentially aligned with the direction of insertion when the connecting head is inserted in the cavity, at least one, e.g. all, of the ports in liquid communication with the interior of the liquid treatment cartridge is provided in a respective surface section of the connecting head inclined with respect to the cartridge axis such that the connecting head tapers in the direction of insertion.

This helps avoid jamming of the connecting head in the cavity. It also helps avoid damage to sealing elements provided around the ports of the connecting head and/or around the ports of the receiving part during insertion and retraction of the connecting head into and from the cavity.

In an embodiment of the liquid treatment apparatus, wherein the liquid treatment cartridge has a cartridge axis, essentially aligned with the direction of insertion when the connecting head is inserted in the cavity, the connecting head and receiving part are provided with at least one set of alignment parts for axially aligning the cartridge axis with an axis of the receiving part corresponding to the direction of insertion, wherein each set includes a groove and at least one protruding alignment part for insertion into the groove when the connecting head is inserted into the cavity.

This facilitates alignment of the cartridge with the receiving part. The ports of the cartridge are correctly aligned with those of the receiving part and the connecting head can be inserted with little risk of jamming. Protruding alignment parts allow the cavity and the connecting head to be tapered.

In an embodiment in which the liquid treatment cartridge has a cartridge axis, essentially aligned with the direction of insertion when the connecting head is inserted in the cavity, the connecting head and receiving part are provided with at least one set of alignment parts for axially aligning the cartridge axis with an axis of the receiving part corresponding to the direction of insertion, and each set includes a groove and at least one protruding alignment part for insertion into the groove when the connecting head is inserted into the cavity, the at least one alignment parts for insertion into a groove are arranged to contact the groove at multiple axial locations simultaneously.

There may be a row of alignment parts for insertion into one particular groove or a single elongated alignment part. To provide correct axial alignment by means of only the sets of alignment parts, multiple points of contact are required.

In an embodiment in which the liquid treatment cartridge has a cartridge axis, essentially aligned with the direction of insertion when the connecting head is inserted in the cavity, the connecting head and receiving part are provided with at least one set of alignment parts for axially aligning the cartridge axis with an axis of the receiving part corresponding to the direction of insertion, and each set includes a groove and at least one protruding alignment part for insertion into the groove when the connecting head is inserted into the cavity, the connecting head is provided with the at least one alignment parts for insertion into a groove of at least one, e.g. all of the at least one sets.

Thus, of each set, it is the connecting head, as opposed to the receiving part, that is provided with the alignment part or parts for insertion into the groove. The receiving part is provided with the groove. If it were the other way around, the connecting head would be weakened by the grooves or need to be provided with thicker walls, which would make it less compact. The cartridge is generally intended for single use, so that its housing should not comprise more material than is necessary to ensure that it does not burst under pressure.

In an embodiment in which the liquid treatment cartridge has a cartridge axis, essentially aligned with the direction of insertion when the connecting head is inserted in the cavity, the connecting head and receiving part are provided with at least one set of alignment parts for axially aligning the cartridge axis with an axis of the receiving part corresponding to the direction of insertion, and each set includes a groove and at least one protruding alignment part for insertion into the groove when the connecting head is inserted into the cavity, at least one of the sets of alignment parts includes a ridge for insertion into the groove, e.g. a ridge on an external surface of the connecting head.

The ridge provides a relatively large contact area with the groove, useful for transferring the force required to move the receiving part with the cartridge. It is also an alignment part of relatively simple construction and may reinforce the connecting head.

In an embodiment of the liquid treatment apparatus in which the liquid treatment cartridge has a cartridge axis, essentially aligned with the direction of insertion when the connecting head is inserted in the cavity, the connecting head and receiving part are provided with at least one set of alignment parts for axially aligning the cartridge axis with an axis of the receiving part corresponding to the direction of insertion, and each set includes a groove and at least one protruding alignment part for insertion into the groove when the connecting head is inserted into the cavity, the at least one alignment parts of at least one of the sets are provided on respective surface sections of the connecting head and the receiving part inclined with respect to the cartridge axis, and at least one of a depth of the groove with respect to a surface section in which the groove is provided and an elevation of at least a sub-set or axial end section of the alignment parts for insertion into the groove closest to an axial end of the liquid treatment cartridge at which the connecting head is provided increases in the direction of insertion, the elevation being with respect to a surface section on which the at least one alignment part for insertion into the groove is provided.

This allows the use of a tapering connecting head and cavity, but also to align the cartridge with respect to the receiving part at the start of insertion of the connecting head into the cavity.

In an embodiment in which the liquid treatment cartridge has a cartridge axis, essentially aligned with the direction of insertion when the connecting head is inserted in the cavity, the connecting head and receiving part are provided with at least one set of alignment parts for axially aligning the cartridge axis with an axis of the receiving part corresponding to the direction of insertion, and each set includes a groove and at least one protruding alignment part for insertion into the groove when the connecting head is inserted into the cavity, the at least one alignment parts for insertion into a groove of at least one of the at least one sets protrudes in a direction that is perpendicular to the plane of rotation upon insertion of the connecting head into the cavity.

A user moves the receiving part by handling the liquid treatment cartridge. The protruding parts in this embodiment are moved laterally with respect to the direction in which they protrude. The force exerted on the cartridge is thus transferred along the length of the protruding alignment part or parts.

In a variant of this embodiment, the at least one alignment parts for insertion into a groove of at least one further set protrudes in an opposite direction that is perpendicular to the plane of rotation upon insertion of the connecting head into the cavity.

There is thus a balance of forces acting on the receiving part. Its movement in the plane of rotation is thus smoother. The forces are exerted on either side of the connecting head, i.e. on either side of a central plane parallel to the plane of rotation and the direction of displacement.

In an embodiment of the liquid treatment apparatus, the liquid treatment cartridge has a cartridge axis, essentially aligned with the direction of insertion when the connecting head is inserted in the cavity, and the liquid treatment cartridge includes at least one laterally protruding part for support by a respective support surface provided by the main part of the device during movement of the receiving part between the first and second positions with the connecting head inserted.

The main part thus carries the weight of the liquid treatment cartridge where it is arranged to depend from the head device in at least the second position. The arrangement for journaling the receiving part with respect to the main part of the head device need not be robust enough also to carry this weight.

In a variant of this embodiment, at least a section of the at least one laterally protruding parts contacting the support surface is rounded.

This makes it easier for the cartridge to swivel as the receiving part rotates. Also, where the support surface is provided with or adjoins a detent, the laterally protruding part can enter and exit the detent more easily.

In an embodiment, in which the liquid treatment cartridge has a cartridge axis, essentially aligned with the direction of insertion when the connecting head is inserted in the cavity, the connecting head and receiving part are provided with at least one set of alignment parts for axially aligning the cartridge axis with an axis of the receiving part corresponding to the direction of insertion, and each set includes a groove and at least one protruding alignment part for insertion into the groove when the connecting head is inserted into the cavity, wherein the liquid treatment cartridge includes at least one laterally protruding part for support by a respective support surface provided by the main part of the device during movement of the receiving part between the first and second positions with the connecting head inserted, at least one of the laterally protruding parts corresponds to one of the at least one alignment parts for insertion into a groove.

There is thus more space on the connecting head for the ports and for relatively strong protruding parts for support by the support surface, because separate alignment parts need not be provided.

In a variant of this embodiment, the support surface for supporting the laterally protruding part is defined by a section of the main part adjoining a gap, and an end of the groove into which the laterally protruding part is insertable is aligned with the gap in the first position, e.g. only in the first of the first and second positions.

This makes insertion of the protruding part also functioning as alignment part possible. It moves past the support surface through the gap. The section defining the support surface is shaped like a ledge. One end of the ledge borders the gap. The ledge also locks the connecting head and thus the cartridge to the main part once the protruding part contacts the support surface.

According to another aspect, there is provided a liquid treatment cartridge presenting the features of a liquid treatment cartridge according to the invention and thus evidently for use in a liquid treatment apparatus according to the invention.

According to another aspect, the method according to the invention of attaching a replaceable liquid treatment cartridge to a head part of a liquid treatment apparatus is characterised in that the receiving part is moved into the second position by also displacing it relative to the main part.

It thus need not be rotated over such a large angle to provide sufficient clearance for handling the liquid treatment cartridge during insertion and retraction of the connecting head into and out of the cavity.

In an embodiment, the head part is mounted to a wall and the direction of displacement is towards the wall.

The liquid treatment cartridge can thus be held relatively close to the head device, even if there are obstructions on either side of the liquid treatment cartridge in the second position.

In an embodiment of the method, the apparatus is an apparatus according to the invention.

BRIEF DESCRIPTION OF THE DRAWINGS

The invention will be explained in further detail with reference to the accompanying drawings, in which.

DETAILED DESCRIPTION

Figure 1:
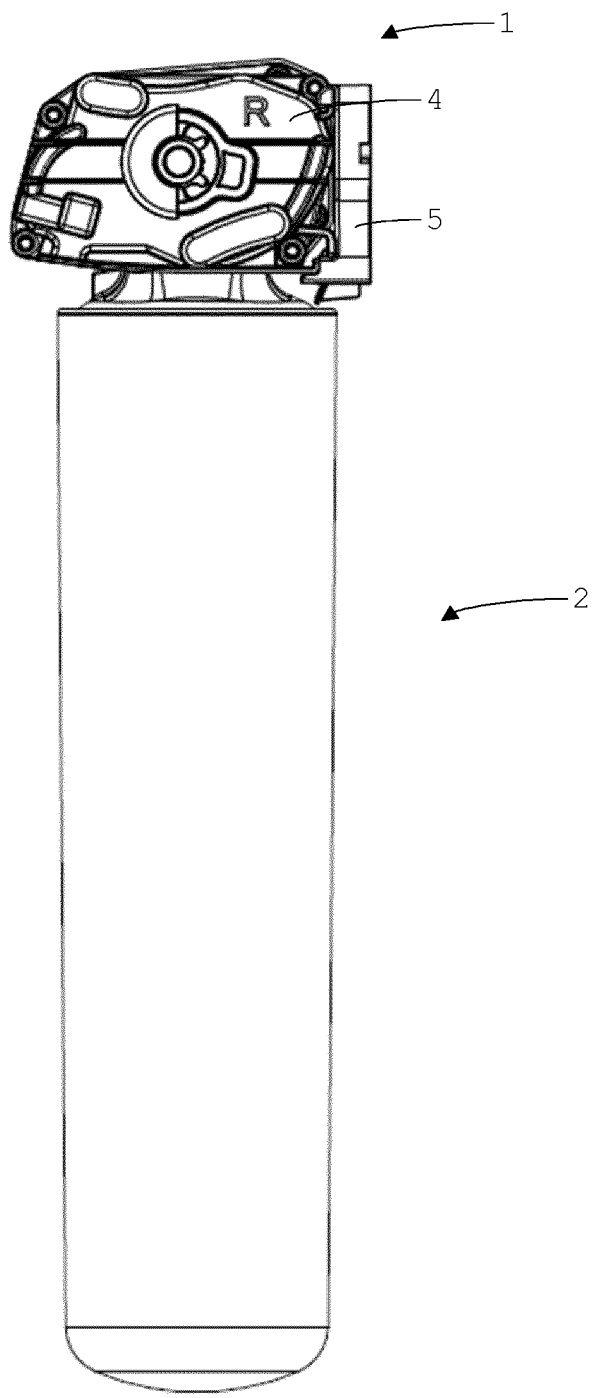
FIG. 1 is a side view of a liquid treatment apparatus including a head part and a replaceable liquid treatment cartridge.

In the following, a liquid treatment apparatus for the treatment of aqueous liquids such as drinking water will be described. The liquid treatment apparatus includes a head part 1 and a replaceable liquid treatment cartridge 2. The head part 1 includes a housing comprising left and right housing parts 3, 4 joined together. It further includes a mounting plate 5 (FIGS. 1-5) for mounting the head part 1 to a wall (not shown). The housing formed by the left and right housing parts 3, 4 is also referred to as the main part of the head part herein. A receiving part 6 is movably journalled within the housing of the main part.

Figure 26:
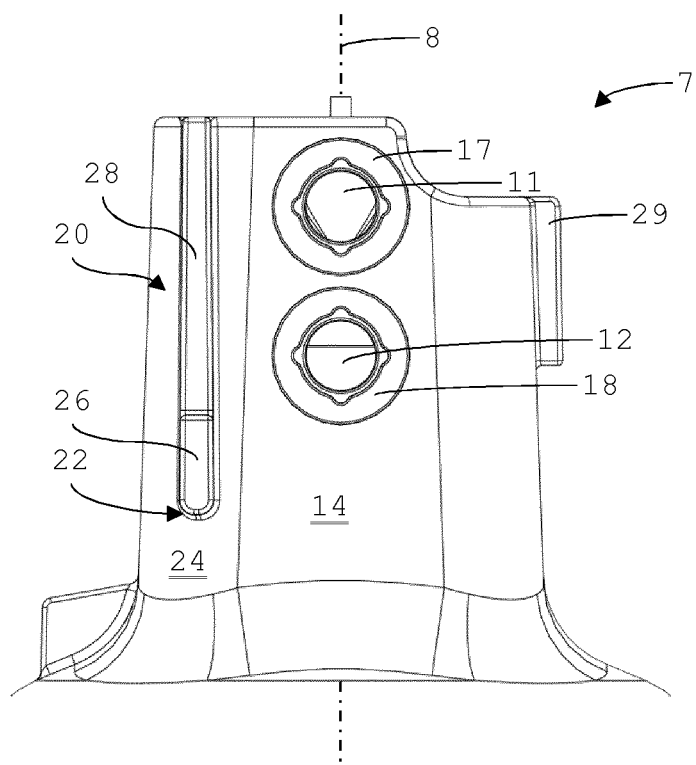
FIG. 26 is a first side view of a connecting head of the liquid treatment cartridge.
Figure 27:
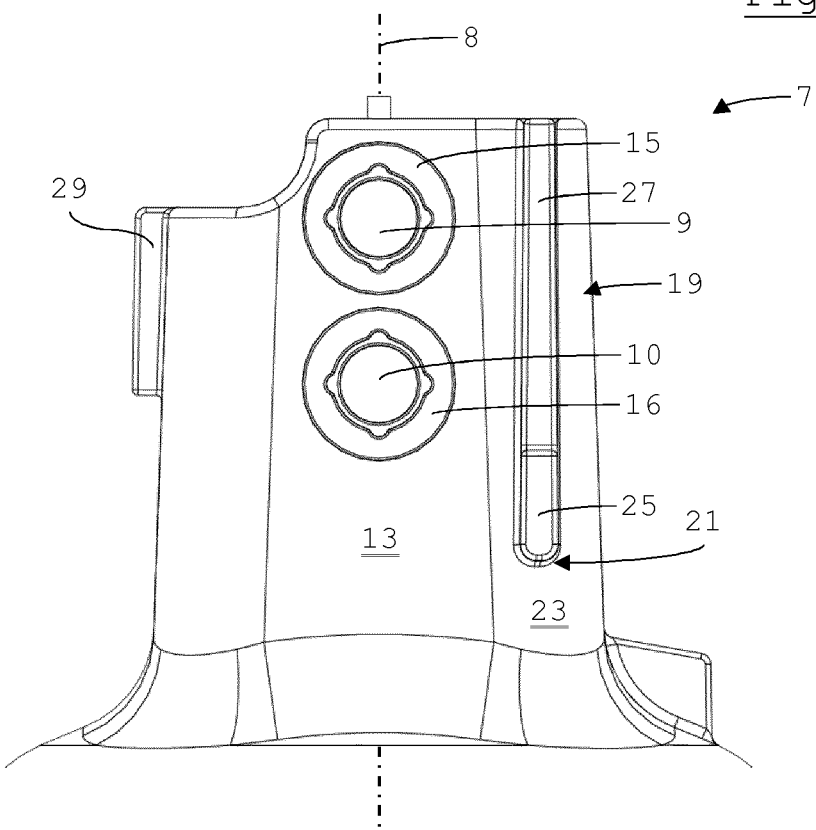
FIG. 27 is a second side view of the connecting head of the liquid treatment cartridge.
Figure 28:
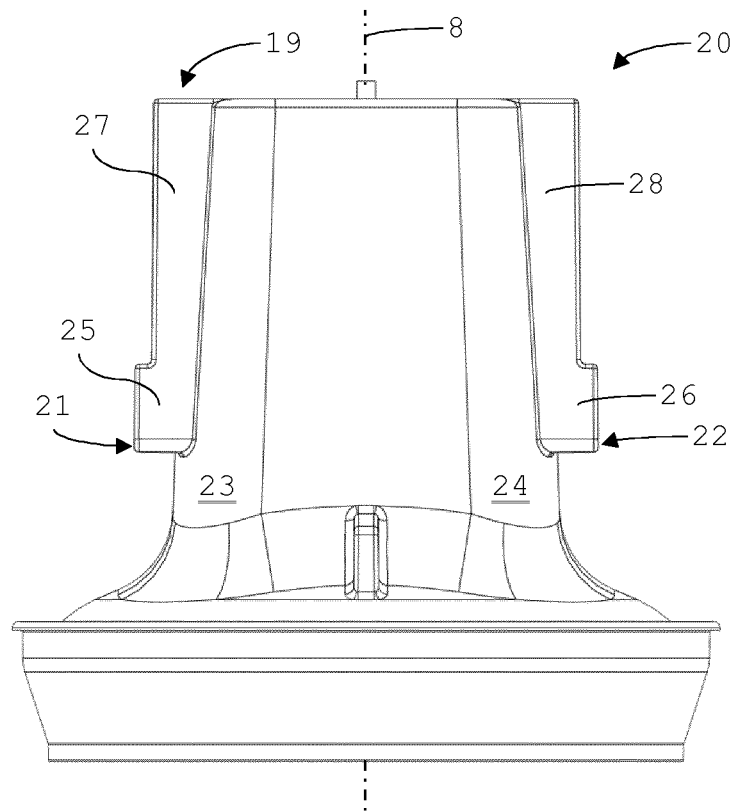
FIG. 28 is a front view of the connecting head of the liquid treatment cartridge.
Figure 29:
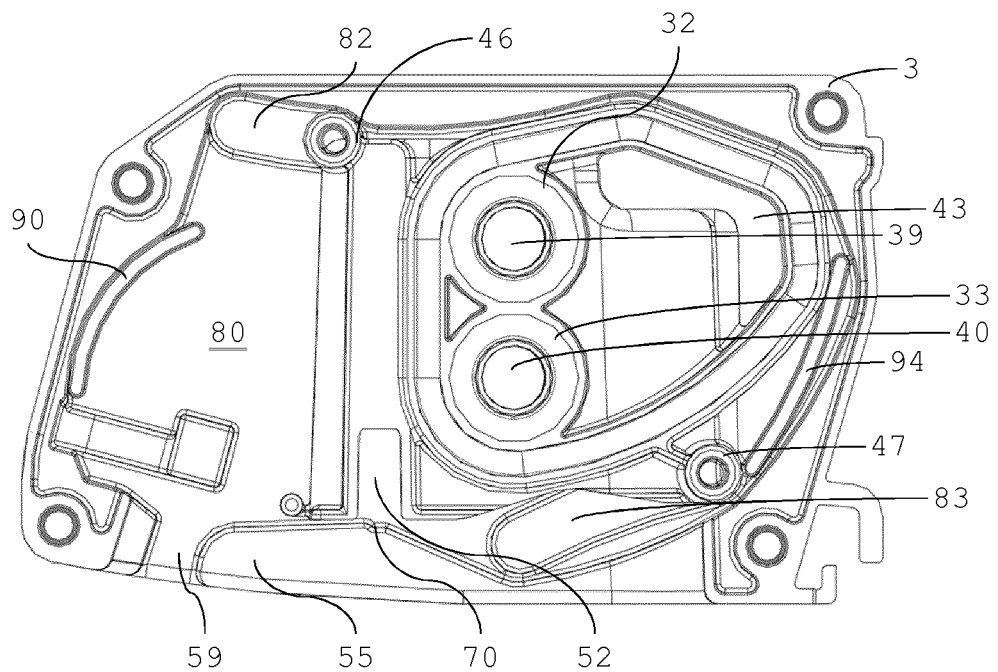
FIG. 29 is a plan view of the inside of the second housing part with the receiving part shown in the second position.
Figure 30:
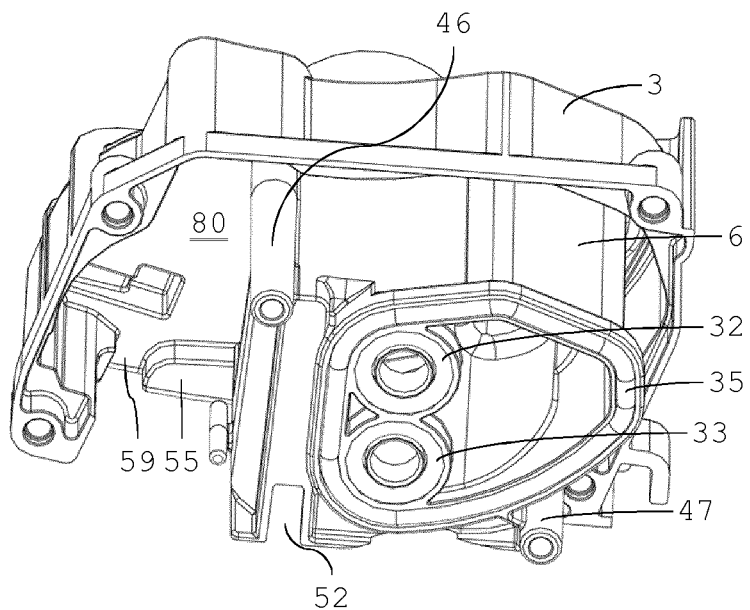
FIG. 30 is a first perspective view of the inside of the second housing part with the receiving part shown in the second position.
Figure 31:
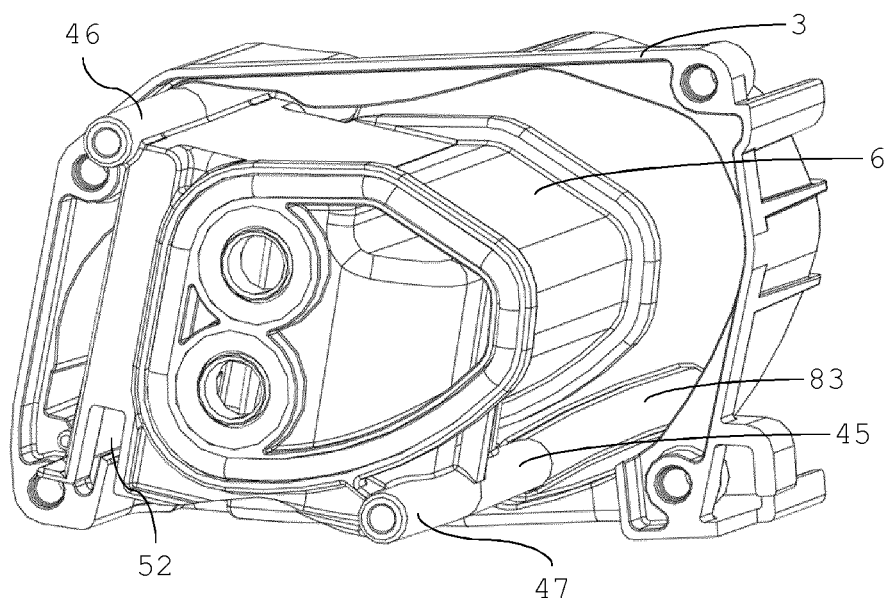
FIG. 31 is a first perspective view of the inside of the second housing part with the receiving part shown in the first position.
Figure 32:
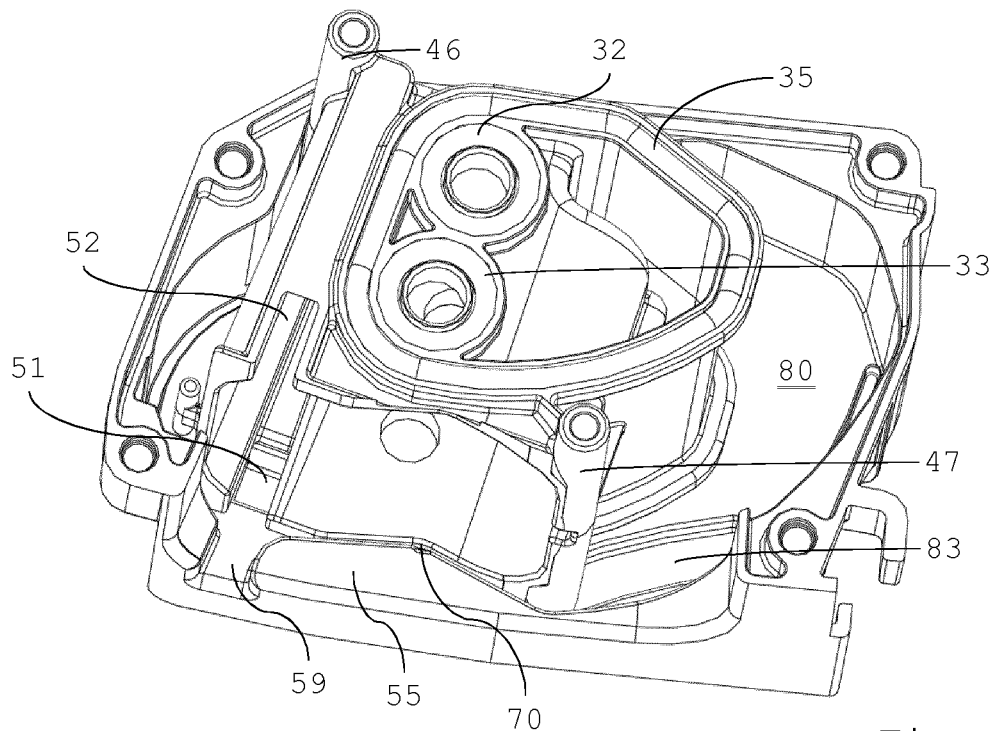
FIG. 32 is a second perspective view of the inside of the second housing part with the receiving part shown in the first position.
Figure 33:
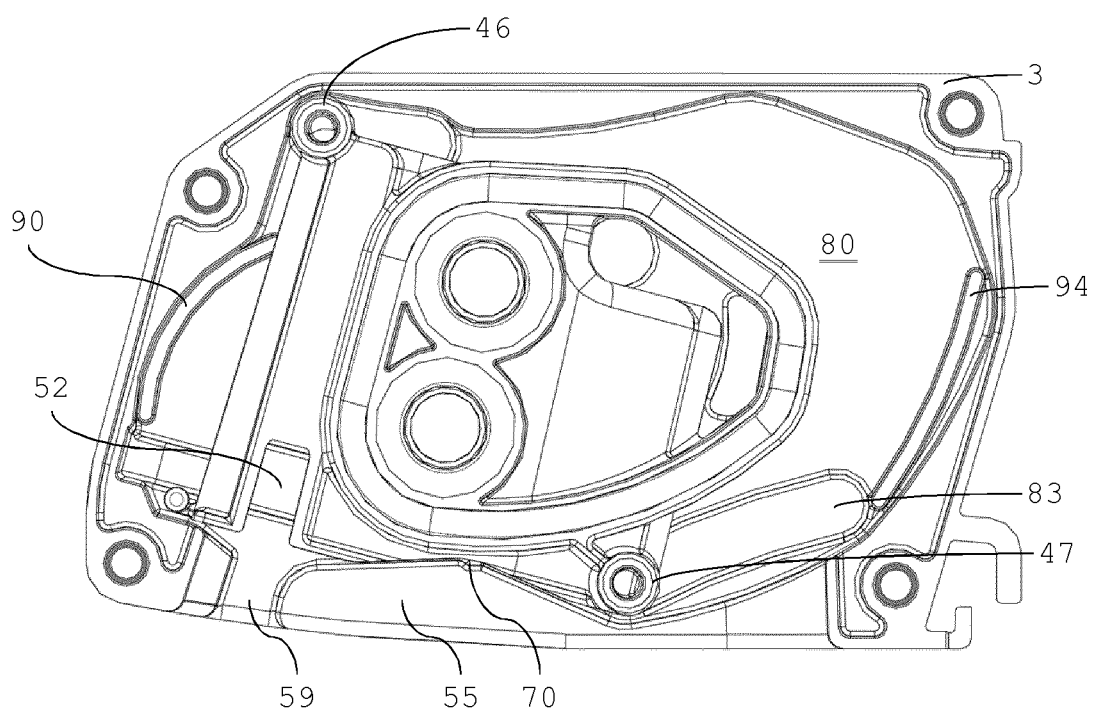
FIG. 33 is a plan view of the inside of the second housing part with the receiving part shown in the first position.
Figure 34:
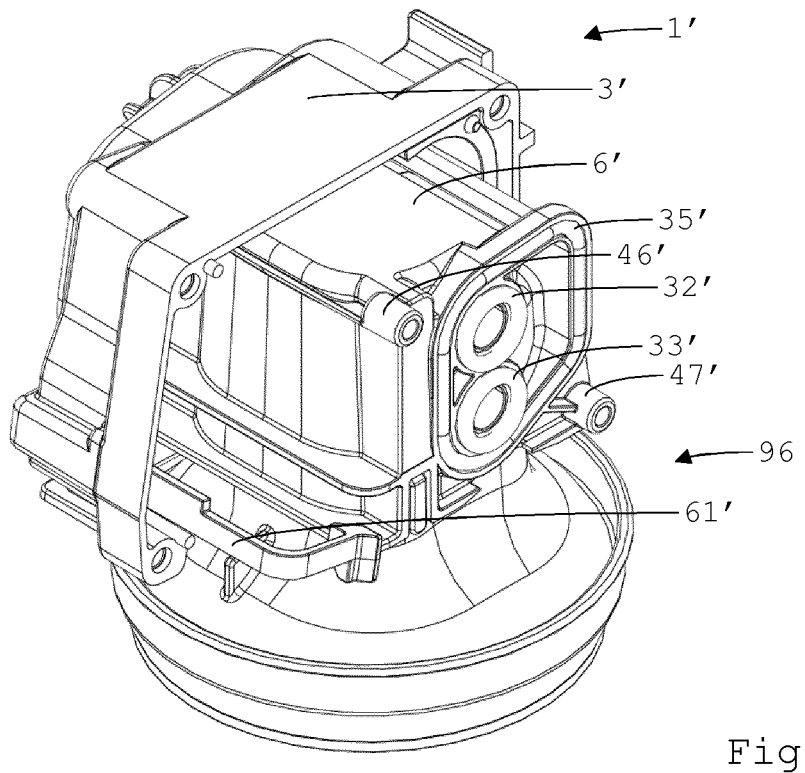
FIG. 34 is a perspective view of the inside of a head part of a second liquid treatment apparatus and a cap-shaped part of a liquid treatment cartridge of the second liquid treatment apparatus.
Figure 35:
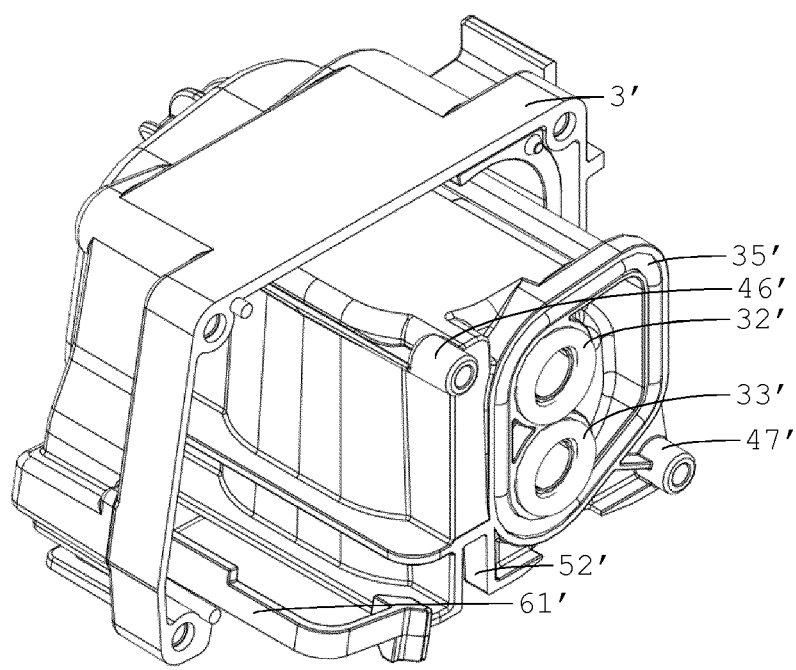
FIG. 35 is a second perspective view of the inside of the head part of FIG. 34, but without the cap-shaped part of the liquid treatment cartridge.

The liquid treatment cartridge 2 is of the type described more fully in international patent application No. PCT/EP2015/050155 of 7 Jan. 2015, the contents of which are hereby incorporated by reference. The liquid treatment cartridge 2 has a housing comprising a vessel of which the opening is closed by a cap-shaped part including a connecting head 7 (FIGS. 26-28). The connecting head 7 is insertable into a cavity of the receiving part 6 when the receiving part 6 is in a first position with respect to the main part.

A reference axis referred to herein as cartridge axis 8 (FIGS. 26-28) is a body axis extending from a closed end of the vessel to the end of the cartridge 2 at which the connecting head 7 is provided. In the illustrated embodiment, the cartridge 2 has an elongated shape and the cartridge axis 8 corresponds to a longitudinal axis of the cartridge 2.

The vessel of the cartridge 2 contains one or more liquid treatment parts (not shown), in particular one or more liquid treatment parts including at least one liquid treatment medium for treating liquid contacting it. The liquid treatment medium may in particular include a liquid treatment medium for the treatment of liquid in a diffusive process, e.g. sorption or elution. Liquid treatment media for the treatment of liquid by sorption include ion exchangers, chelating resins and sorbents. Particular examples include activated carbon and ion exchange resins, e.g. cation exchange resins. The cation exchange resin may be a weakly acidic cation exchange resin. The cation exchange resin may be in the hydrogen form. Thus, the liquid treatment medium may be a liquid treatment medium for reducing at least one of the carbonate hardness and the total hardness of water.

Alternatively, the cartridge 2 may contain a mechanical filtration module, e.g. a membrane module for microfiltration, nanofiltration or reverse osmosis.

The receiving part 6 is movably journalled within the housing for movement between a first position (FIGS. 2 and 31-33), in which the connecting head 7 is insertable into and retractable from the cavity defined in the receiving part 6, and a second position (FIGS. 1,3,5-7, 9 and 29-30), in which the cartridge 2 is locked to the head part 1. The second position corresponds to a position in which the cartridge axis 8 is essentially parallel or at an acute angle to the wall to which the head part 1 is mounted. In the first position, the cartridge 2 is spaced apart from the wall and the cartridge axis 8 is at a larger angle to the wall. To move the cartridge 2 with the connecting head 7 inserted into the cavity of the receiving part 6 together with the receiving part, it is both swiveled and displaced, i.e. moved closer to or further away from the wall.

The connecting head is provided with four cartridge ports 9-12 in liquid communication with an interior of the cartridge 2. First and second ports 9, 10 (FIG. 27) are provided in a first surface section 13 facing in a direction at an angle to the cartridge axis 8 such that the connecting head 7 tapers towards the axial end of the cartridge 2 at which the connecting head 7 is provided. Third and fourth cartridge ports 11, 12 (FIG. 26) are provided in a second surface section 14 facing in a direction at an angle to the cartridge axis 8 such that the connecting head 7 tapers towards the axial end of the cartridge 2 at which the connecting head 7 is provided. The first and second connecting head surface sections 13, 14 are on opposite sides of the connecting head 7. The first and second cartridge ports 9, 10 are axially aligned, as are the third and fourth cartridge ports 11, 12. Each of the cartridge ports 9-12 is surrounded by a respective sealing element 15-18. The first and second connecting head surface sections 13, 14 are planar, so that the sealing elements 15-18 are compressed relatively uniformly when pressed against a co-operating surface to form a seal around the cartridge ports 9-12.

A first alignment ridge 19 is provided adjacent the first and second cartridge ports 9, 10. A second alignment ridge 20 is provided adjacent the third and fourth cartridge ports 11, 12. The alignment ridges 19, 20 extend in a direction essentially parallel to the cartridge axis 8. (Lower) axial ends 21, 22 distal to the axial end of the cartridge 2 at which the connecting head 7 is provided are rounded.

The first and second alignment ridges 19, 20 are provided on curved surface sections 23, 24 in this example. These surface sections 23, 24 face in directions at an angle to the cartridge axis 8 such that the connecting head 7 tapers in axial direction towards the end of the cartridge 2 at which the connecting head 7 is provided. Each of the first and second alignment ridges 19, 20 has a first section 25, 26 extending to the rounded end 21, 22 and a second section 27, 28 extending to an opposite axial end of the alignment ridge 19, 20 concerned. There is a stepped transition between the two sections 25, 27 of the first alignment ridge 19 and between the two sections 26, 28 of the second alignment ridge 20. The stepped transition is such that the elevation with respect to the surface section 23, 24 decreases stepwise from the first section 25, 26 to the second section 27, 28. This allows the first sections 25, 26 to function as stops, as will be explained. Furthermore, the elevation of the second sections 27, 28 with respect to the surface section 23, 24 increases in axial direction towards the axial end of the cartridge 2 at which the connecting head 7 is provided, so as to compensate for the taper of the connecting head 7 (cf. FIG. 28). Surfaces of the second alignment ridge sections 27, 28 facing in the direction of projection are thus at an essentially constant distance to the cartridge axis 8 along their axial extent. It is noted that, although the surface sections 23, 24, due to their curvature, do not face in exactly opposite directions, the alignment ridges 19, 20 do protrude in opposite directions. These directions are perpendicular to a reference plane in which the cartridge axis 8 lies. In the example, the reference plane is a plane of symmetry of the connecting head 7. The reference plane is also parallel to a plane of rotation of the receiving part 6 when the connecting head 7 is inserted into the cavity of the receiving part 6. It is observed that the connecting head 7 is further provided with a third alignment ridge 29 (FIGS. 26,27), which is of a different shape to the first and second alignment ridges 19, 20.

Figure 10:
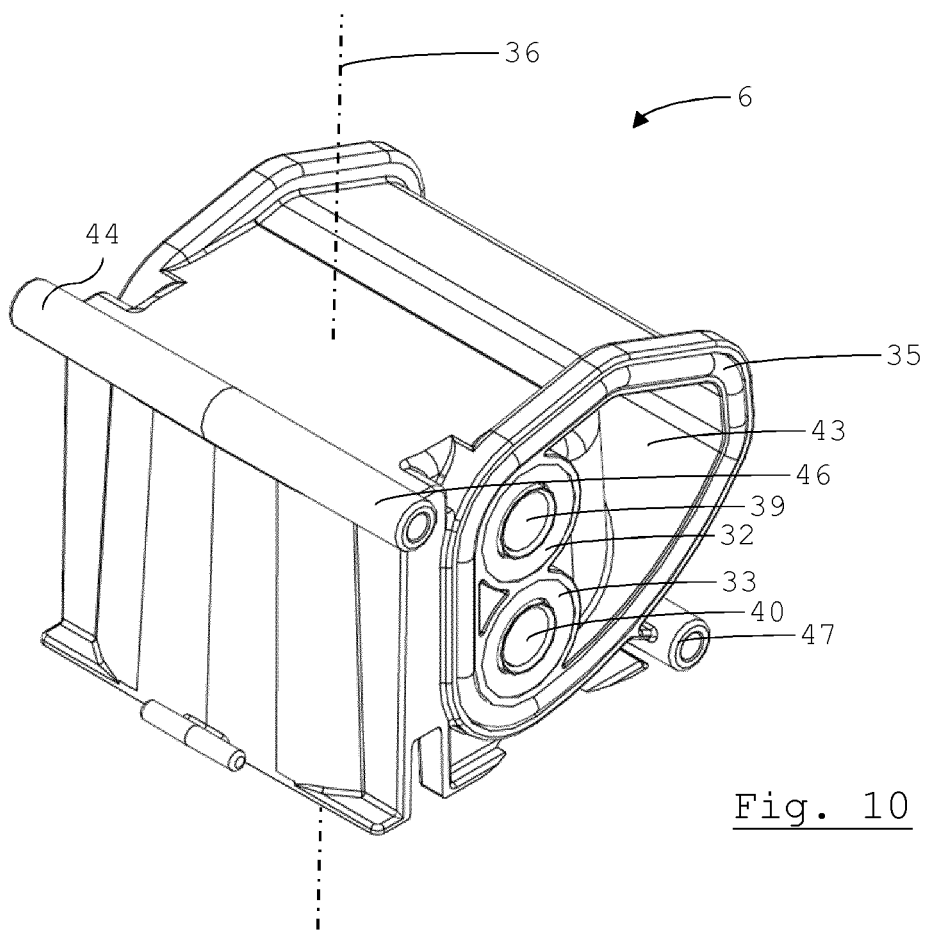
FIG. 10 is a first perspective view of the receiving part.
Figure 11:
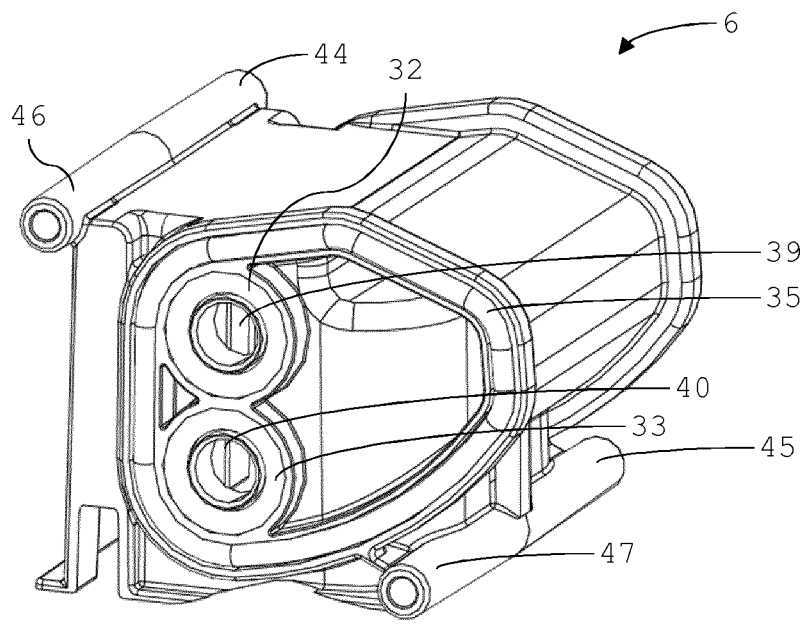
FIG. 11 is a second perspective view of the receiving part.
Figure 12:
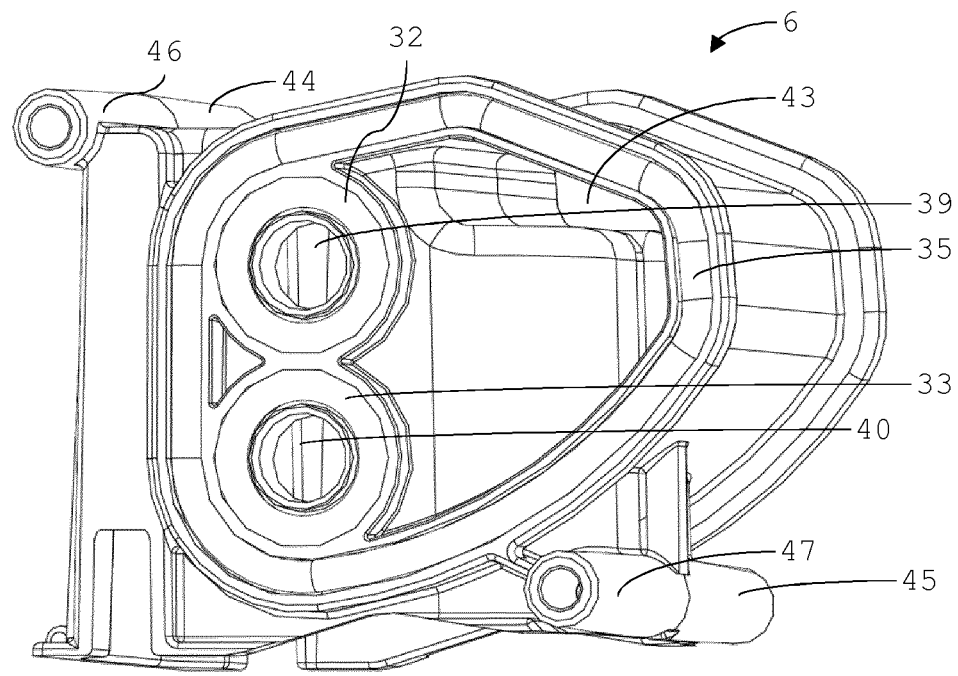
FIG. 12 is a third perspective view of the receiving part.

The receiving part 6 includes a body and, in this example, first to sixth sealing elements 30-35. The body defines a cavity for receiving the connecting head 7. It is possible to define a reference axis 36 (FIG. 10) parallel to the direction of insertion of the connecting head 7 into the cavity and thus essentially perpendicular to the mouth of the cavity. This receiving part axis 36 lies in a plane of intrinsic rotation of the receiving part 6, the axis of rotation being perpendicular thereto. Furthermore, as the receiving part 6 is moved between the first and second positions, it is displaced in a direction parallel to this plane (but not to the receiving part axis 36).

The cavity has a shape corresponding to that of the connecting head 7. It thus tapers in axial direction towards the end opposite the mouth of the cavity.

Figure 13:
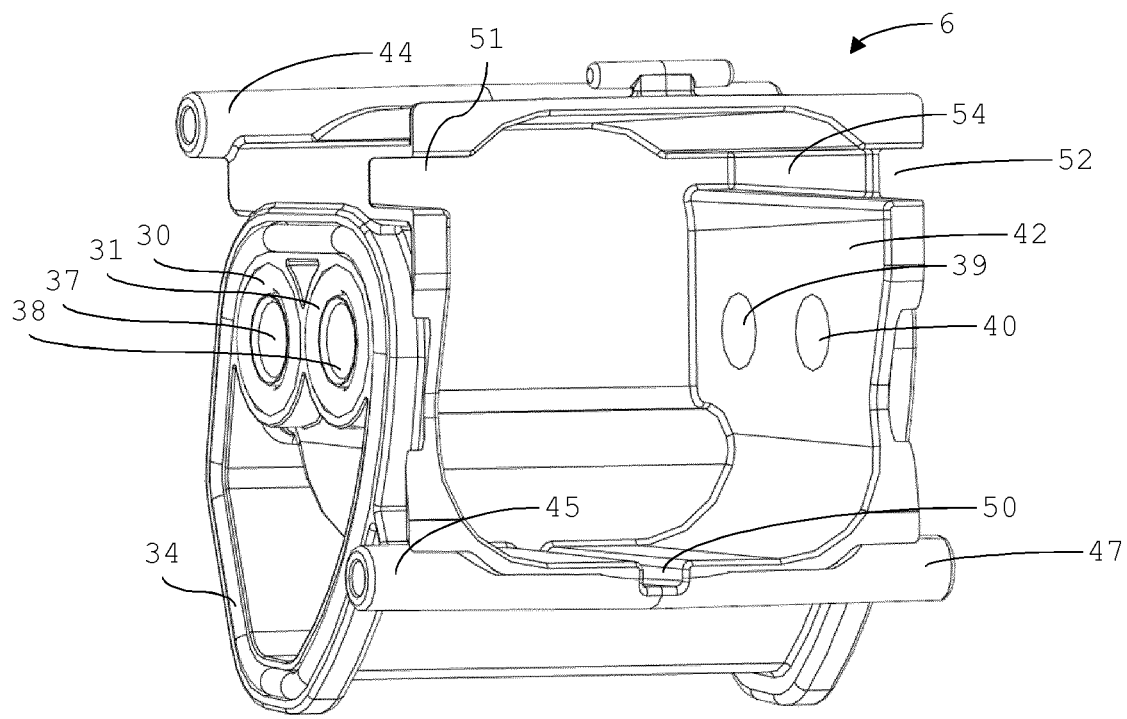
FIG. 13 is a first perspective view of an underside of the receiving part.
Figure 14:
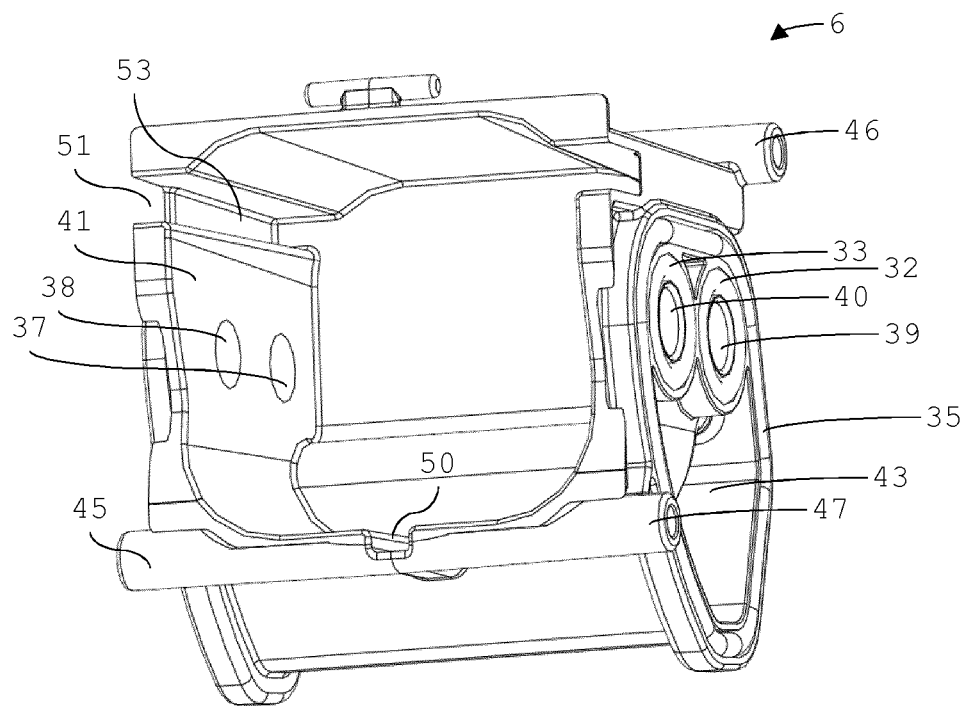
FIG. 14 is a second perspective view of the underside of the receiving part.
Figure 15:
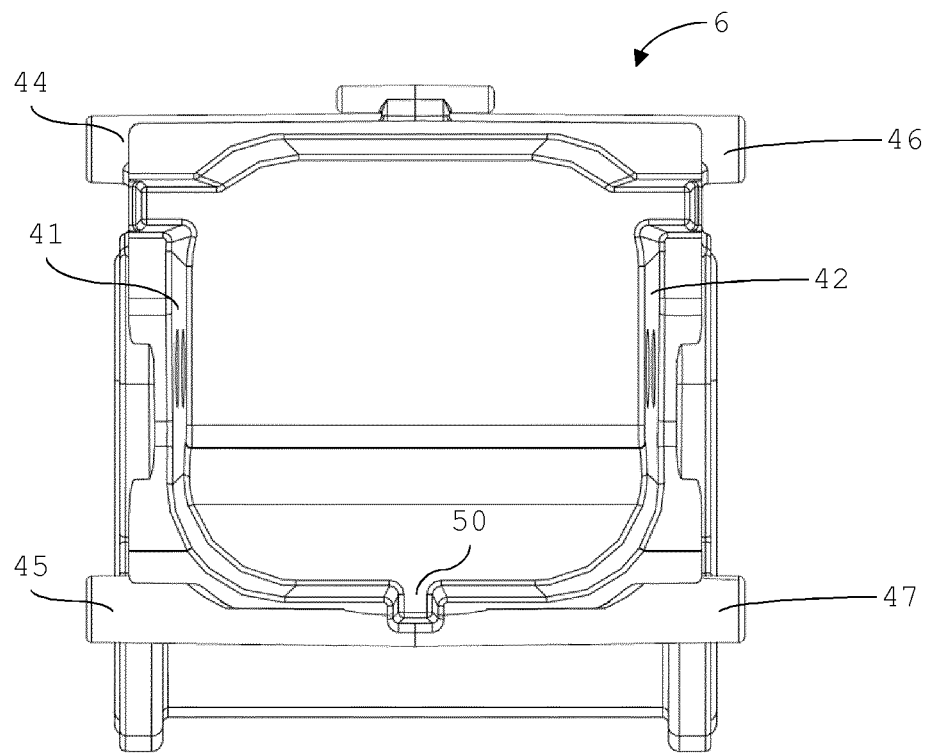
FIG. 15 is a plan view of the underside of the receiving part.
Figure 16:
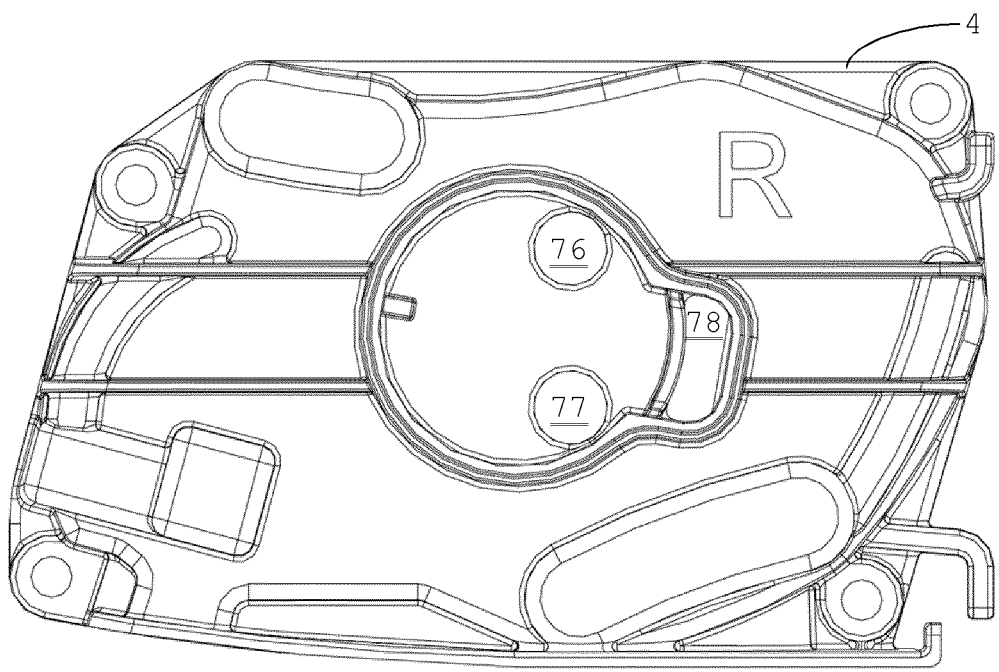
FIG. 16 is a side view of a first housing part of the main part.
Figure 17:
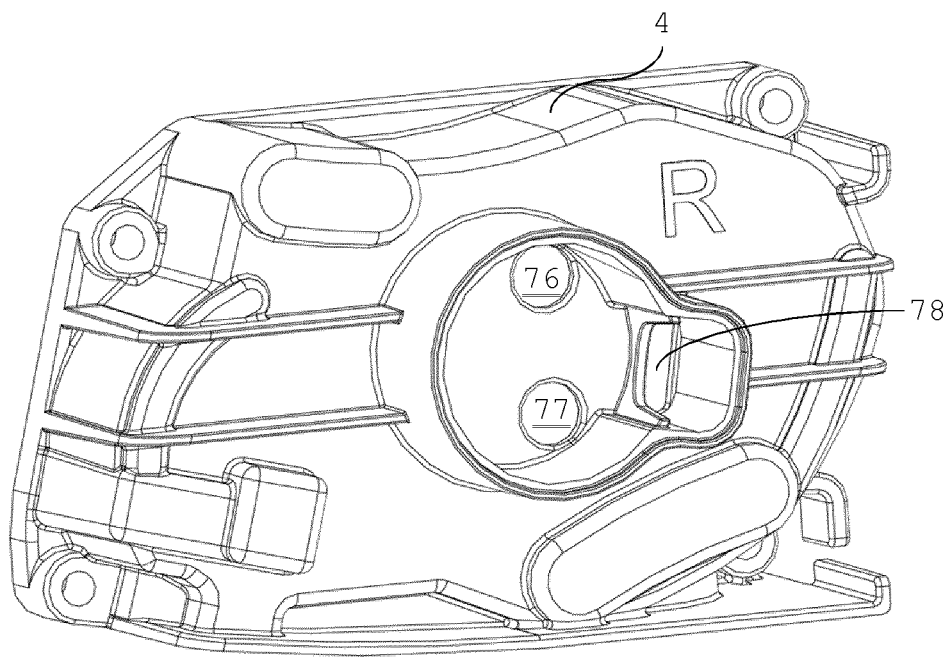
FIG. 17 is a perspective view of the housing part of FIG. 16.
Figure 18:
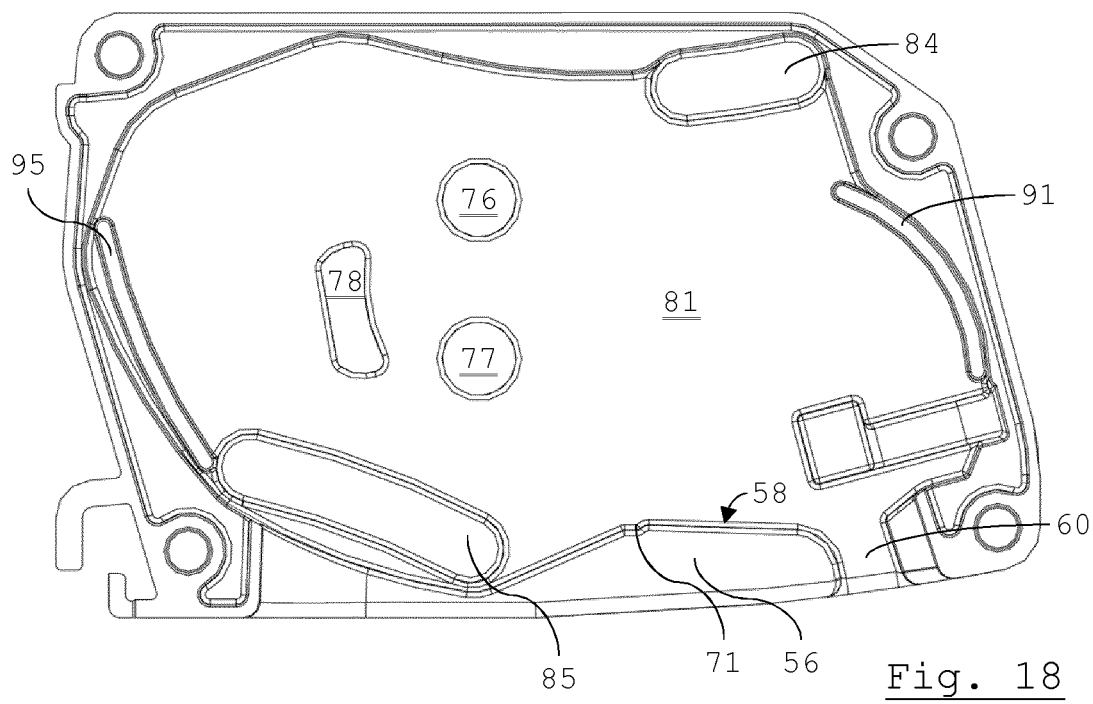
FIG. 18 is a plan view of the inside of the housing part of FIGS. 16 and 17.
Figure 19:
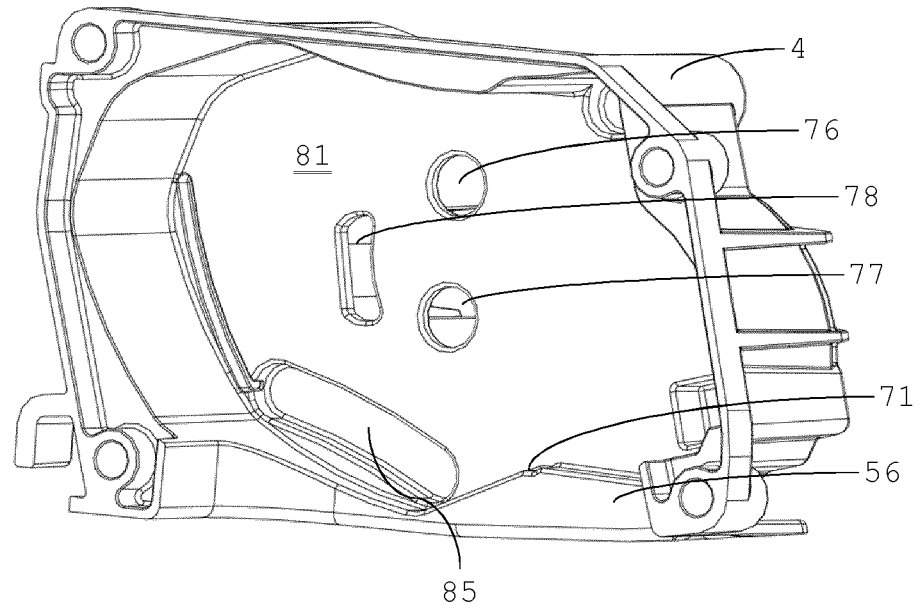
FIG. 19 is a first perspective view of the inside of the housing part of FIGS. 16-18.
Figure 20:
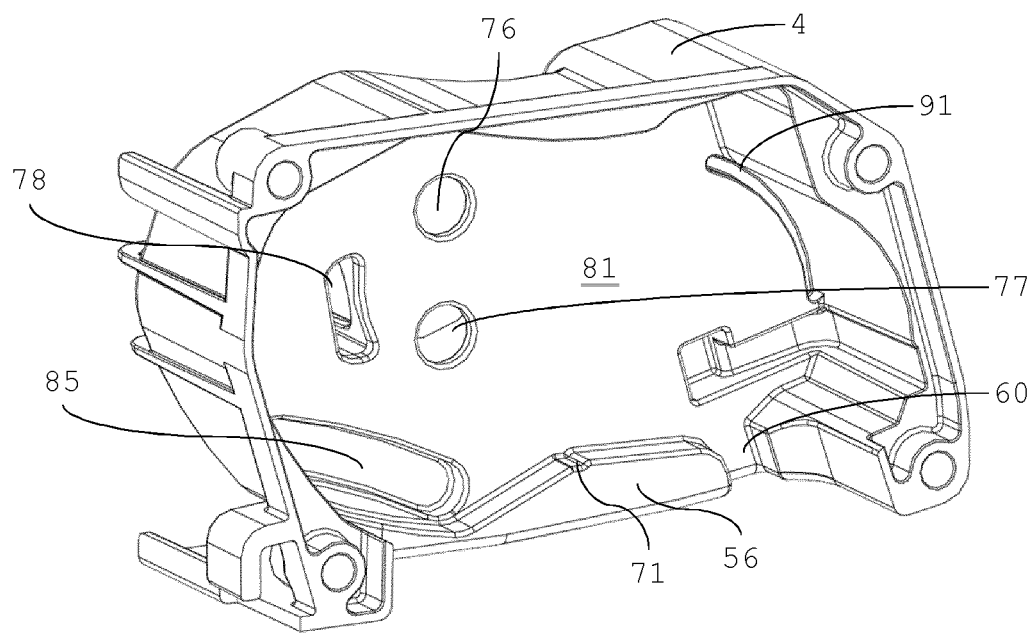
FIG. 20 is a second perspective view of the inside of the housing part.
Figure 21:
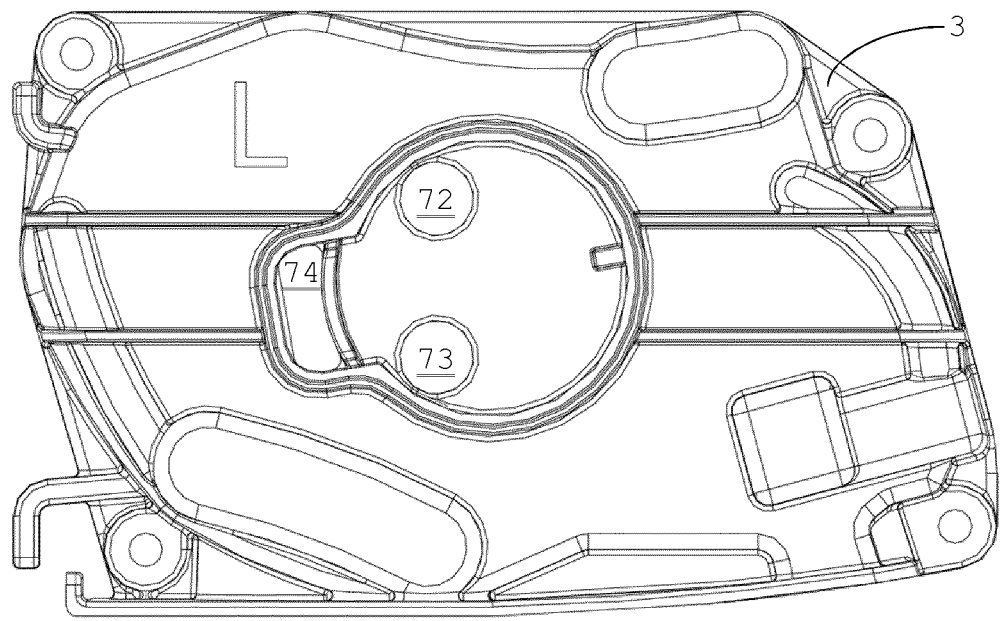
FIG. 21 is a plan view of a second housing part of the main part.
Figure 22:
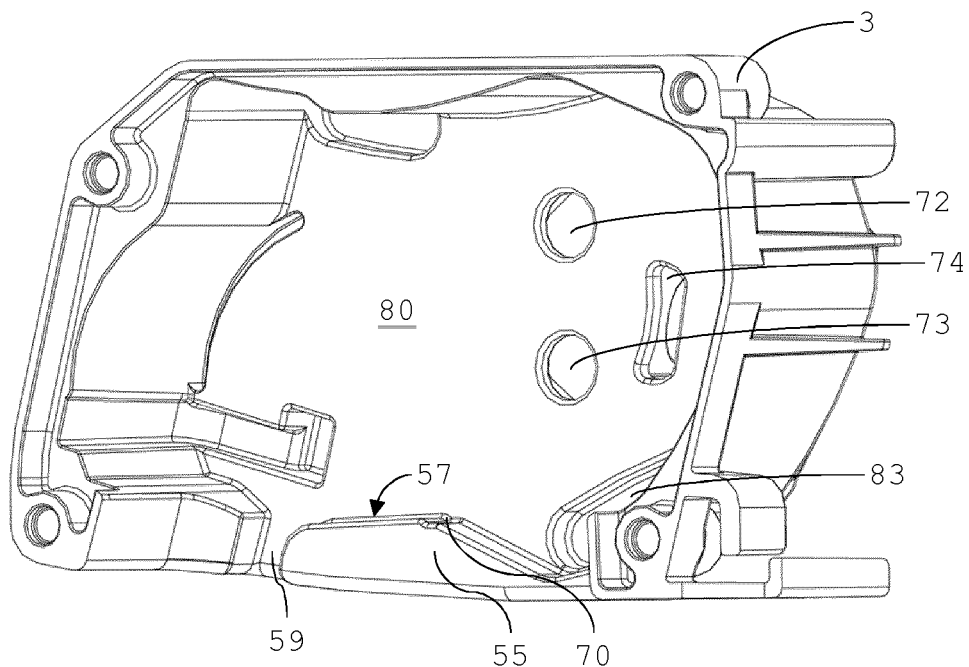
FIG. 22 is a first perspective view of an inside of the second housing part.
Figure 23:
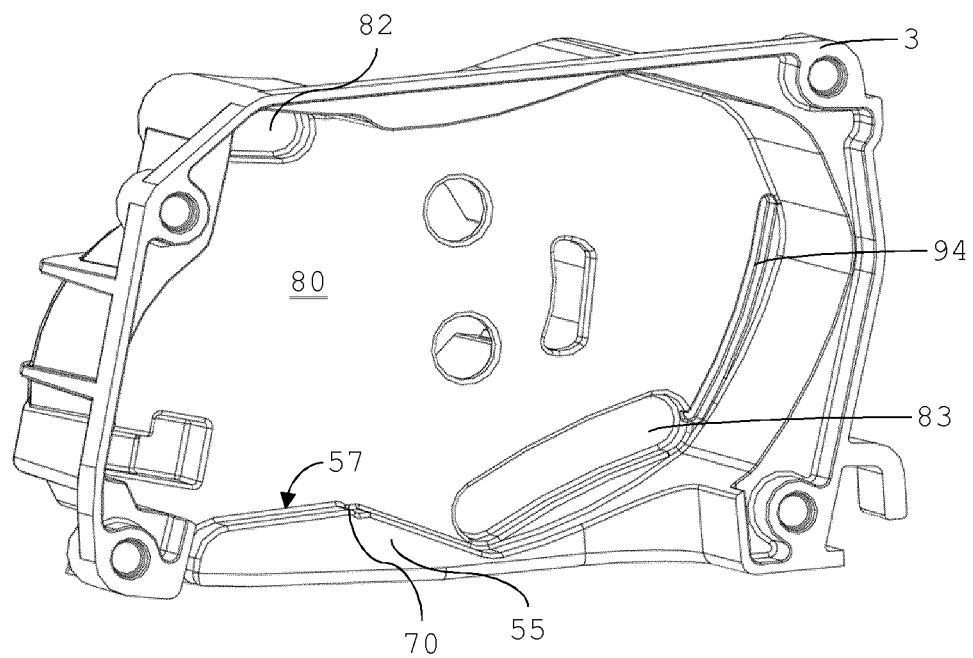
FIG. 23 is a second perspective view of the inside of the second housing part.
Figure 24:
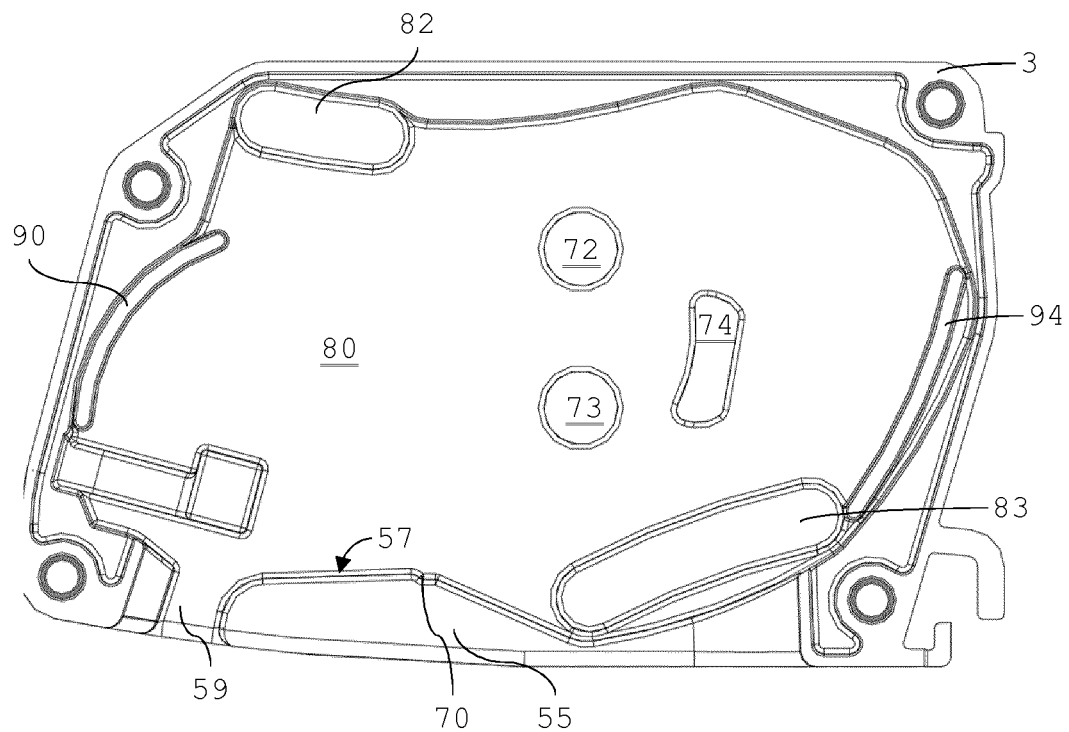
FIG. 24 is a plan view of the inside of the second housing part.
Figure 25:
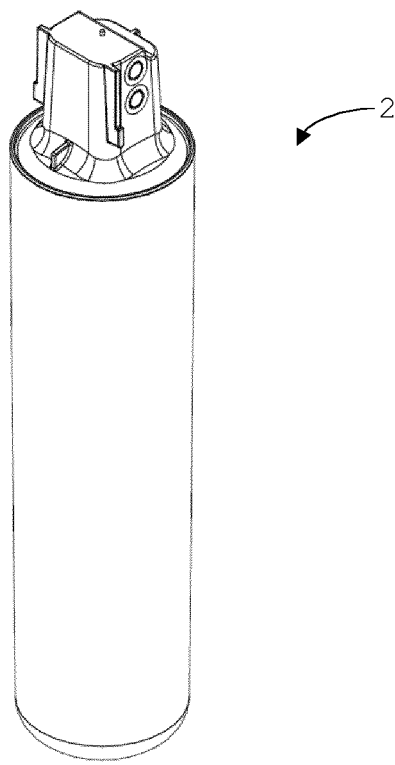
FIG. 25 is a perspective view of the replaceable liquid treatment cartridge.

Liquid-permeable ports 37-40 are provided in opposing side walls defining the cavity. First and second ports 37, 38 are provided in a first side wall section 41 (FIGS. 13,14). Third and fourth ports 39, 40 are provided in a second side wall section 42. The first and second side wall sections 41, 42 are essentially planar. They have interior surfaces delimiting the cavity laterally with respect to the receiving part axis 36.

When the connecting head 7 is fully inserted into the cavity, the cartridge ports 9-12 are each in sealed liquid communication with a respective one of the receiving part ports 37-40. The sealing elements 15-18 on the connecting head co-operate with the side wall sections 41, 42 to provide the seals preventing liquid from flowing into the cavity.

The receiving part sealing elements 30-33 surround the receiving part ports 37-40 on the exterior of the receiving part 6.

A bypass channel 43 (FIGS. 9,10,12,29) is defined in the body of the receiving part 6. The bypass channel 43 extends from one side of the receiving part 6 to an opposite side. This channel bypasses the cavity. Fifth and sixth receiving part sealing elements 34, 35 each surround both an opening of the bypass channel 43 and two of the ports 37-40 with their surrounding sealing elements 30-33. This arrangement allows the receiving part 6 to function as the valve member of a valve mechanism structured similarly to a sliding gate valve.

Guide protrusions 44-47 (FIGS. 10-15) are defined by the body of the receiving part 6. Two guide protrusions 44-47 are provided on either of opposite sides of the receiving part 6. Each of the guide protrusions 44-47 is aligned with a guide protrusion 44-47 on the opposite side of the receiving part 6.

Alignment grooves 48-50 (FIG. 15) are at least open towards the cavity and in this example also at axial ends adjacent a mouth of the cavity. First and second alignment grooves 48, 49 are for receiving the first and second alignment ridges 19, 20 when the connecting head 7 is inserted into the cavity of the receiving part 6. A third alignment groove 50 (FIGS. 12-14) is for receiving the third alignment ridge 29. The first and second alignment grooves 48, 49 are on opposite sides of the cavity, facing each other. First (lower) sections 51, 52 (FIGS. 13,14) extend through the side wall sections of the receiving part 6 in which they are provided to form slits through these side wall sections. They are provided at the axial ends proximal to the mouth of the cavity. Second (upper) alignment groove sections 53, 54 are shaped as slots in the side wall sections in which they are provided. These sections 53, 54 have depths smaller than the thickness of the side wall sections in which they are provided. They are located at the axial ends distal to the mouth of the cavity. The depth of each of the second alignment groove sections 53, 54 increases in axial direction towards the axial end distal to the mouth of the cavity, in order to compensate for the taper of the cavity. The edge at the transition between the first alignment groove section 51, 52 and the second alignment groove section 53, 54 functions as a stop against which the first alignment ridge sections 25, 26 abut when the alignment ridges 19, 20 are inserted into the alignment grooves 48, 49. The first alignment ridge sections 25, 26 have an elevation exceeding the thickness of the side wall section in which the first alignment groove sections 51, 52 are provided, so that these alignment ridge sections 25, 26 protrude from the receiving part in opposite directions when the connecting head 7 is inserted into the cavity.

The left and right housing parts 3, 4 are provided with ledges 55, 56 defining support surfaces 57, 58 for supporting the inserted connecting head 7 by the rounded ends 21, 22 of the first and second alignment ridges 19, 20 after the connecting head 7 has been fully inserted into the cavity in the first position of the receiving part 6 and then moved some way towards the second position. The ledges 55, 56 thus also prevent retraction of the connecting head 7 in any other position of the receiving part 6 than the first position. To allow for the insertion of the connecting head 7 into the cavity in the first position, the ledges 55, 56 adjoin gaps 59, 60 having a width equal to at least the width of the first and second alignment ridges 19, 20.

Figure 8:
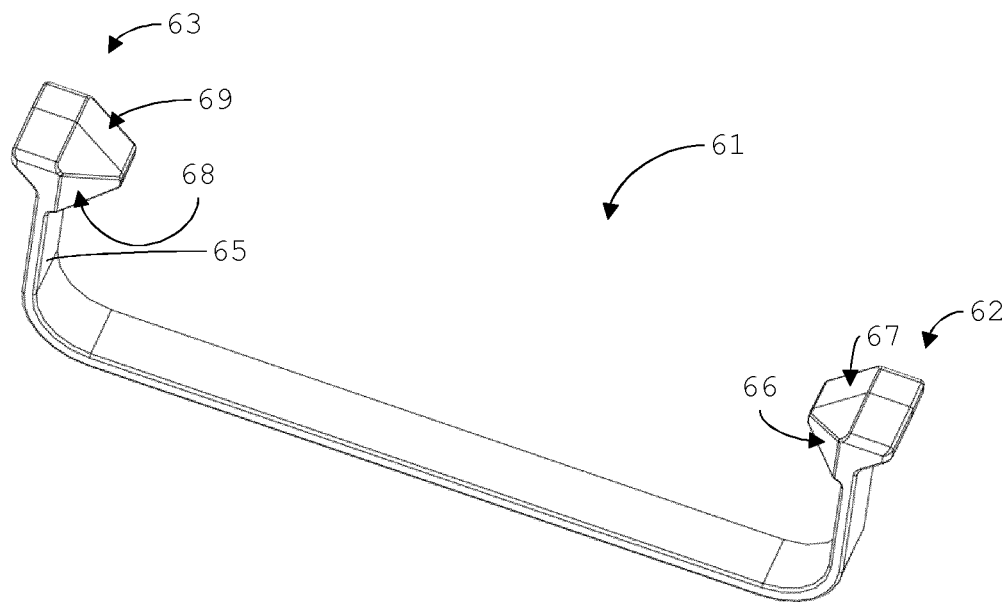
FIG. 8 is a perspective view of a latching device for holding the receiving part in the first position.
Figure 9:
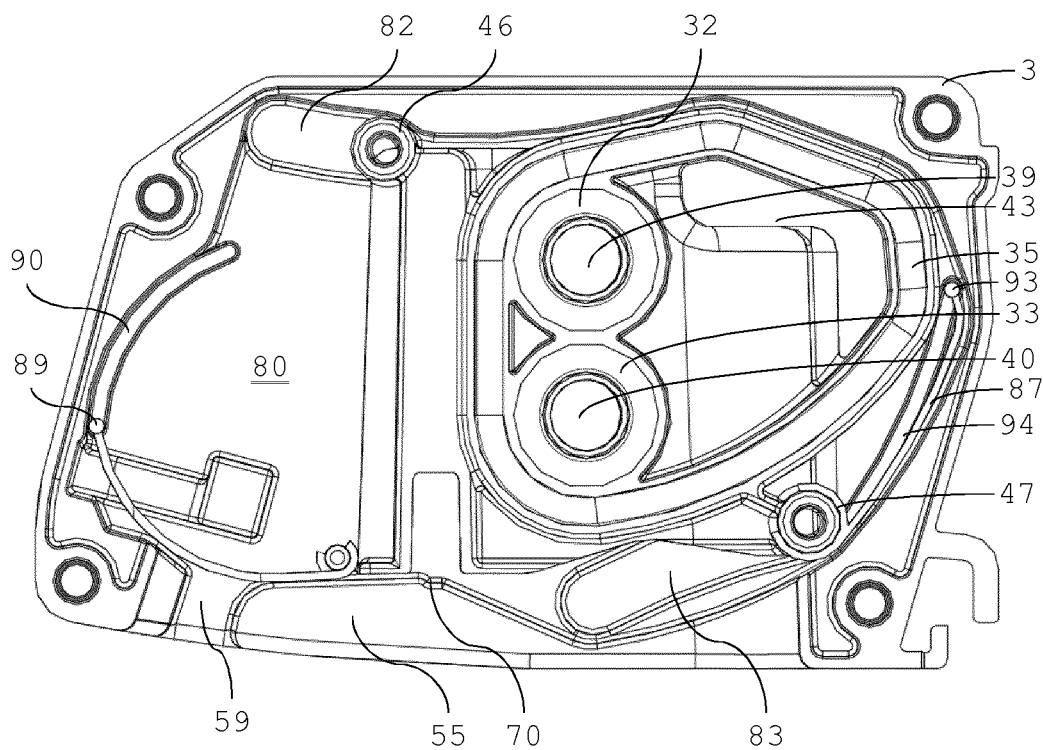
FIG. 9 is a plan view of the head part with part of the main part cut away to show the receiving part and the screening parts.

The alignment grooves 48, 49 should be held in alignment with the gaps 59, 60 after the cartridge 2 has been removed for replacement. To this end, a latching device 61 (FIG. 8) is provided. The latching device 61 is a single resilient, essentially U-shaped insert having pawls 62, 63 at respective free ends of its arms 64, 65. Part of the receiving part 6 is received between the arms 64, 65 in the first position. In that position, the pawls 62, 63 engage the first alignment groove sections 51, 52 when these are not occupied by the first alignment ridge sections 25, 26.

When the receiving part 6 is moved into the first position, it forces the arms 64, 65 apart. When the cartridge 2 is then retracted, the pawls 62, 63 snap into place. When the connecting head 7 of the replacement cartridge is inserted into the receiving part 6, the first alignment ridge sections 25, 26 urge the pawls 62, 63 out of the slits formed by the first alignment groove sections 51, 52 to release the receiving part 6, which can then be moved into the second position. Because the first alignment groove sections are engaged by the pawls 62, 63, the receiving part 6 is only released when the connecting head 7 has been fully inserted and is also able to clear the ledges 55, 56.

To ease the engagement, the pawls 62, 63 are provided with facets 66-69. Downwardly directed facets 66, 68 are for engaging the first alignment ridge sections 25, 26. They face in part in a direction opposite to the direction of insertion of the connecting head 7 and in part towards each other. Facets 67, 69 for engaging the receiving part 6 face in part in a direction of movement of the receiving part 6 out of the first position and in part towards each other. Surfaces on opposite sides to the facets 67, 69 are essentially at right angles to the adjacent arm sections in order to provide strong shape-lock.

It will be clear that movement of the receiving part 6 is coupled to that of the connecting head 7 between the first and second positions. In the illustrated example, this movement is arrested in the second position through the interaction of the rounded ends 21, 22 of the first and second alignment ridges 19, 20 with detents 70, 71 in the ledges 55, 56. In an alternative embodiment, a similar function may be exercised by appropriately sized gaps adjacent ends of the ledges 55, 56. In either case, the ledges 55, 56 define detents. The detents 70, 71 are aligned with the alignment grooves 48, 49 in the second position of the receiving part 6.

As each rounded end 21, 22 moves across the support surface 57, 58 with the receiving part 6 moving with it towards the second position, the axial distance of the support surface 57, 58 to an axial end of the cavity distal to a mouth of the cavity decreases. The connecting head 7 is thus urged further into the cavity.

In an embodiment (not shown), the left and right housing parts 3, 4 may each be provided with at least one section defining a guide surface facing mainly in a same direction as a mouth of the cavity of the receiving part 6 for guiding the first alignment ridge sections 25, 26 during at least part of movement of the receiving part from the second to the first position. With respect to the receiving part axis 36, an axial distance of the support surface of at least one of such sections to an axial end of the cavity distal to a mouth of the cavity increases towards the first position over at least a section of the support surface. Thus, the connecting head 7 can also be urged out of the cavity some distance before the receiving part 6 reaches the first position.

Figure 2:
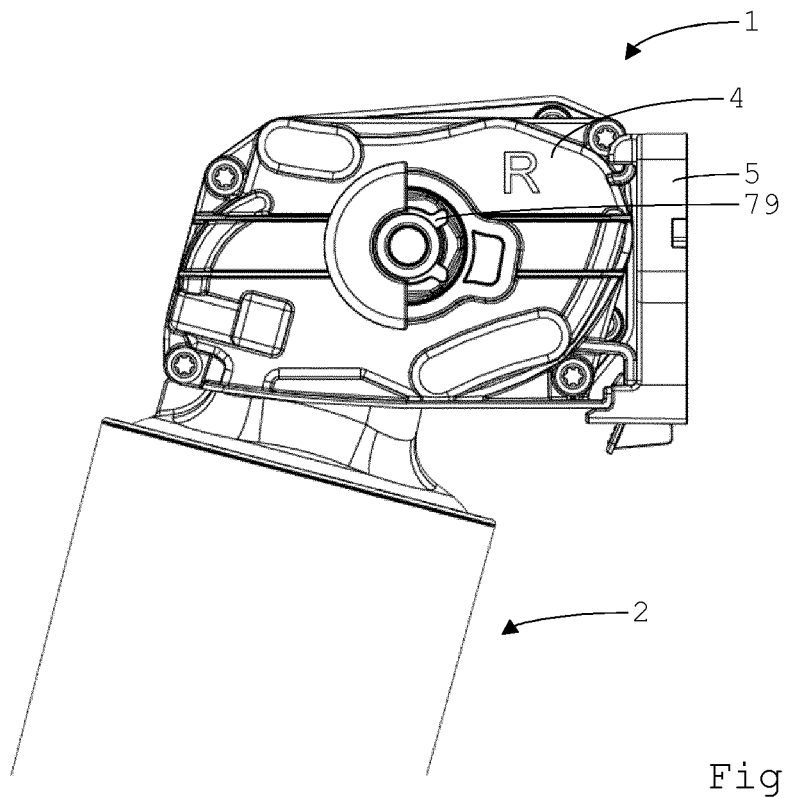
FIG. 2 is an enlarged side view of the head part with the replaceable liquid treatment cartridge in a first position.
Figure 3:
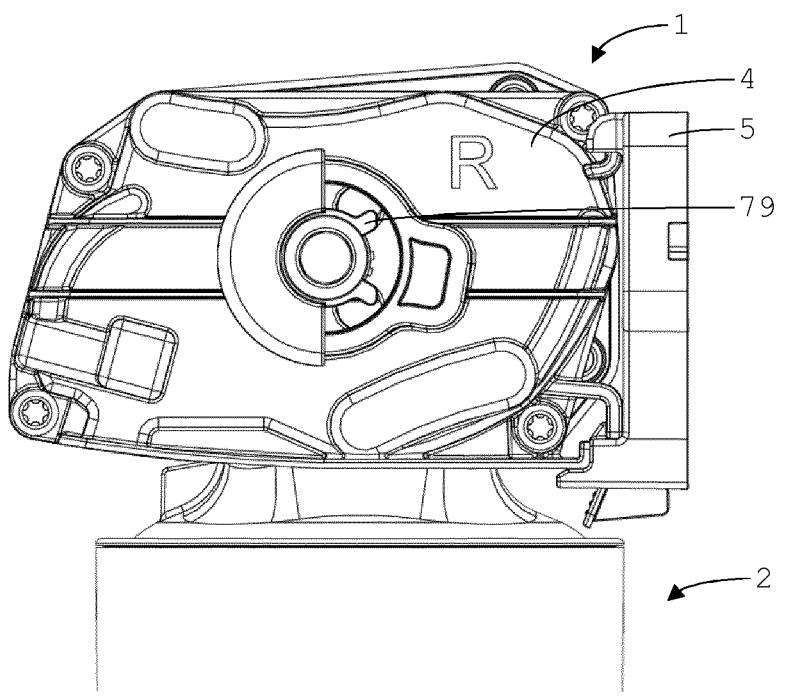
FIG. 3 is an enlarged side view of the head part with the replaceable liquid treatment cartridge in a second position.
Figure 4:
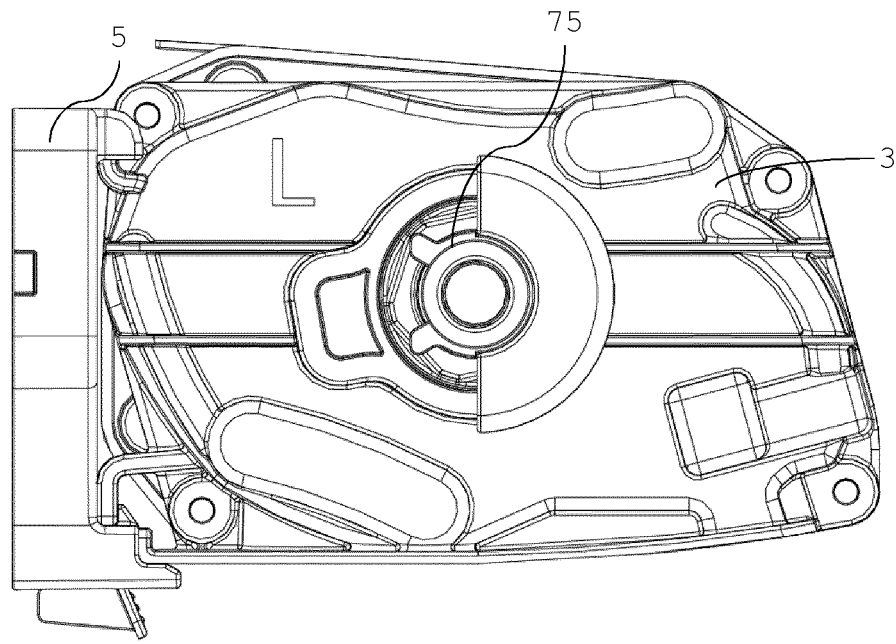
FIG. 4 is a side plan view of the head part.
Figure 5:
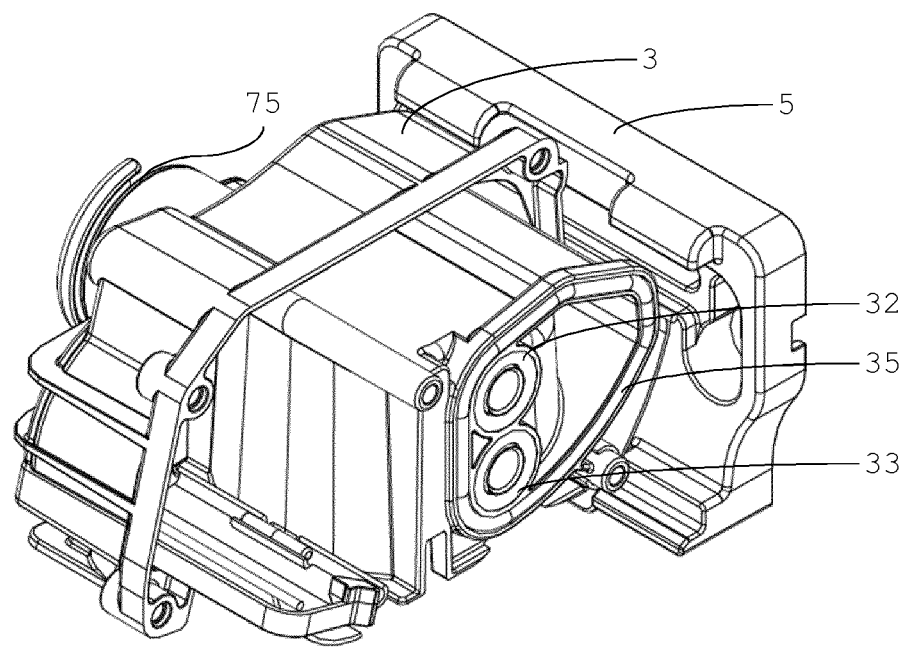
FIG. 5 is a perspective view of the head part with a part of a main part thereof cut away to show a receiving part.
Figure 6:
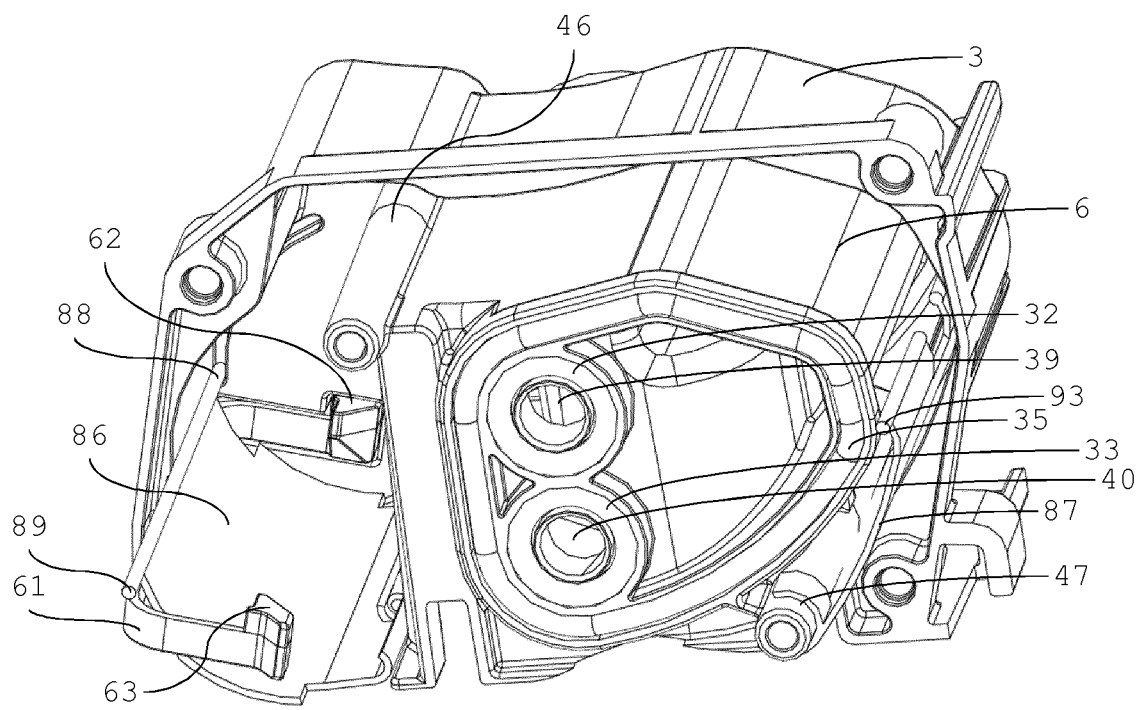
FIG. 6 is a perspective view from a different angle of the head part with part of the main part cut away to show the receiving part and screening parts attached thereto.
Figure 7:
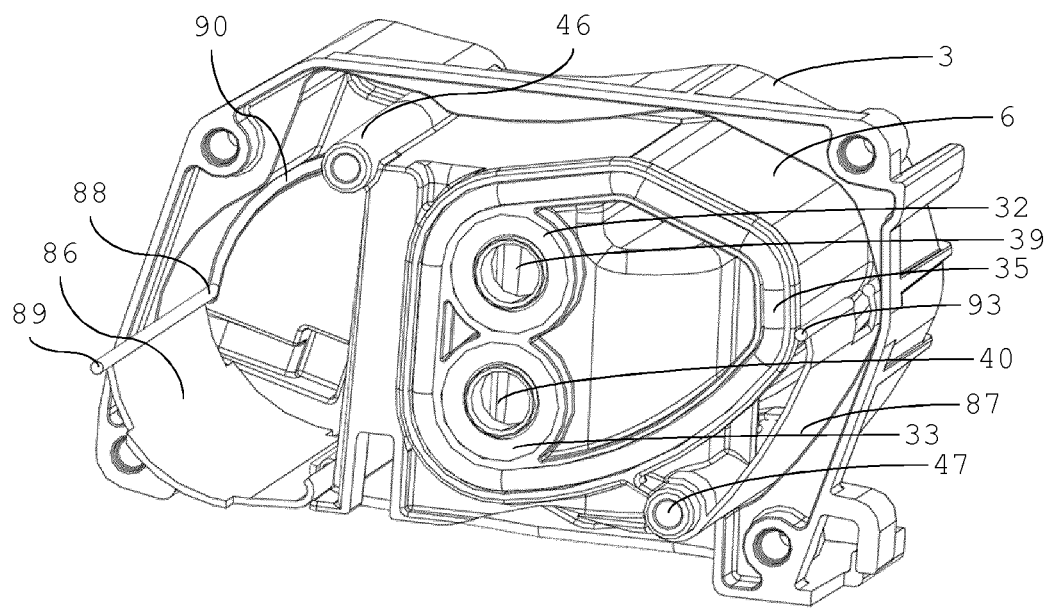
FIG. 7 is a further perspective view of the head part with part of the main part cut away to show the receiving part and the screening parts.

Defined in the left housing part 3 are upper and lower main ports 72, 73 and a bypass port 74 (FIGS. 21-24). A connector interface 75 (FIG. 4) allows one or more conduits (not shown) to be placed in fluid communication with the ports 72-74. Similarly, upper and lower main ports 76, 77 and a bypass port 78 (FIGS. 16-20) are defined in the right housing part 4. One or more conduits (not shown) may be placed in fluid communication with the ports 76-78 if provided with one or more connectors for mating with a connector interface 79 (FIGS. 2-3). For example, the ports 72-74 of the left housing part 3 may all be placed in liquid communication with a supply conduit for delivering liquid to be treated. The main ports 76, 77 may be placed in liquid communication with one or two delivery conduits for supplying treated liquid and the bypass port 78 may be placed in liquid communication with a separate conduit for delivering untreated liquid or liquid that has been treated differently or to a different extent. It is noted that the main ports 72, 73, 76, 77 have a circular outline. The bypass ports 74, 78 have an elongated shape.

The receiving part 6 functions as the movable valve member for a valve mechanism regulating the flow of liquid through the main ports 72, 73, 76, 77. The main ports 72, 73, 76, 77 are provided in walls presenting interior surfaces 80, 81 (FIGS. 18-20, 22-24) of the housing in which the receiving part 6 is movably journalled. The surfaces 80, 81 are essentially parallel to a plane of rotation of the receiving part 6 and the direction of displacement of the receiving part 6. They are essentially planar where the receiving part 6 moves along them. The receiving part sealing elements 30-35 are each held against one of these surfaces 80, 81 such that the seals are formed. The fifth receiving part sealing element 34 surrounds the main ports 72, 73 and the bypass port 74 of the left housing part 3 in all positions between and including the first and second position of the receiving part 6. The sixth receiving part sealing element 35 surrounds the main ports 76, 77 and the bypass port 78 of the right housing part 4 in all positions of the receiving part 6 between and including the first and second positions of the receiving part 6. Only in the second of the first and second positions (FIGS. 29, 30) are the main ports 72, 73 fully aligned with the first and second receiving part ports 37, 38 and the main ports 76, 77 fully aligned with the third and fourth receiving part ports 39, 40. Thus, in the second position, only the bypass ports 74, 78 are in direct liquid communication via the bypass channel 43. In the other positions, all the ports 72-74, 76-78 are in liquid communication with each other via the bypass channel 43. The surfaces 80, 81 then close the receiving part ports 37-40. The fifth and sixth receiving part sealing elements 34, 35 thus prevent liquid from entering the cavity in the housing in which the receiving part 6 is movably journalled.

The receiving part 6 is movably journalled by the guide protrusions 44-47 which are guided for movement in guide grooves 82-85 in the left and right housing parts 3, 4. The cavity in the housing formed by the left and right housing parts 3, 4 obviously has a mouth large enough to accommodate the movement of the inserted section of the cartridge 2. As the receiving part 6 moves across this mouth between the first and second positions, first and second screening parts 86, 87 (FIGS. 6-8) close sections of the housing cavity mouth adjacent the receiving part 6, so that foreign objects and dirt cannot enter easily. The screening parts 86, 87 are hingedly attached to the receiving part 6 at one end and journalled to the housing at an opposite end. Thus, the first screening part 86 is provided with guide protrusions 88, 89 guided for movement in guide grooves 90, 91. The second screening part 87 is provided with guide protrusions 92, 93 guided for movement in guide grooves 94, 95.

The receiving part 6 is thus able to carry out a combined displacement and intrinsic rotation between the first and second position within the housing formed by the left and right housing parts 3, 4 and thereby function also as a movable valve member.

A second embodiment (FIGS. 34-49) of a liquid treatment apparatus is substantially similar to the embodiment of FIGS. 1-33. Like parts are indicated using like reference numerals and only the more salient aspects and the differences compared to the first embodiment are described.

Figure 36:
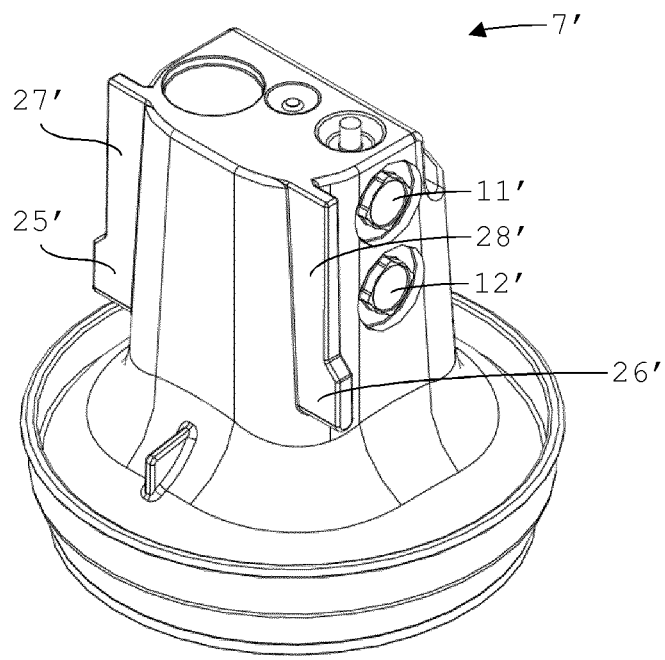
FIG. 36 is a perspective view of a cap-shaped part of a liquid treatment cartridge for use in the second liquid treatment apparatus.
Figure 37:
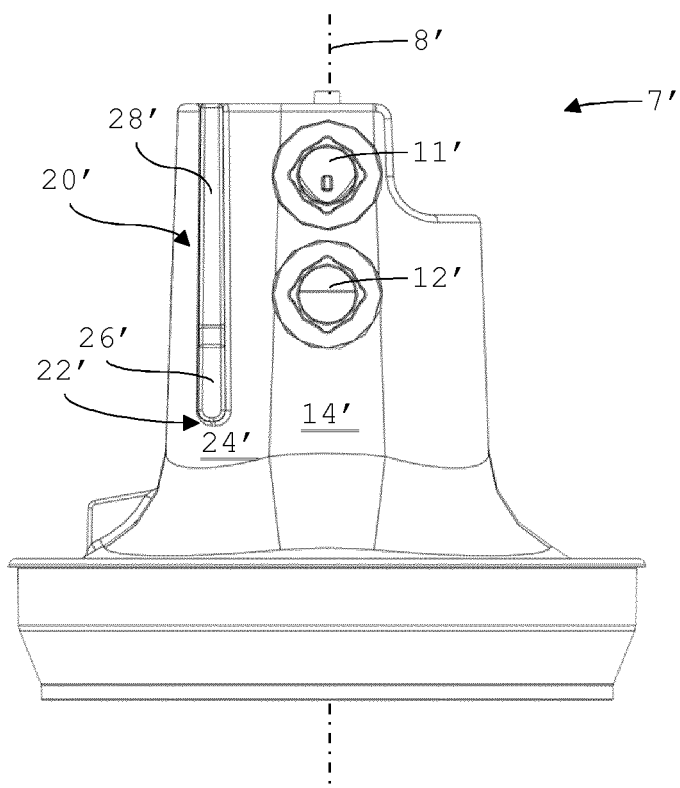
FIG. 37 is a side plan view of the cap-shaped part of FIG. 36.
Figure 38:
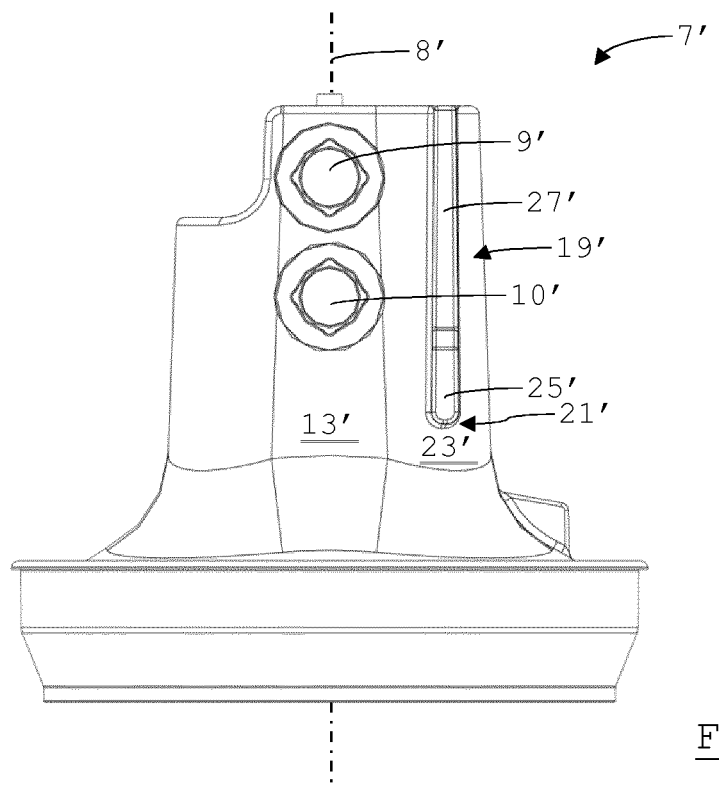
FIG. 38 is a side plan view of the cap-shaped part of FIG. 37 from the opposite side.
Figure 39:
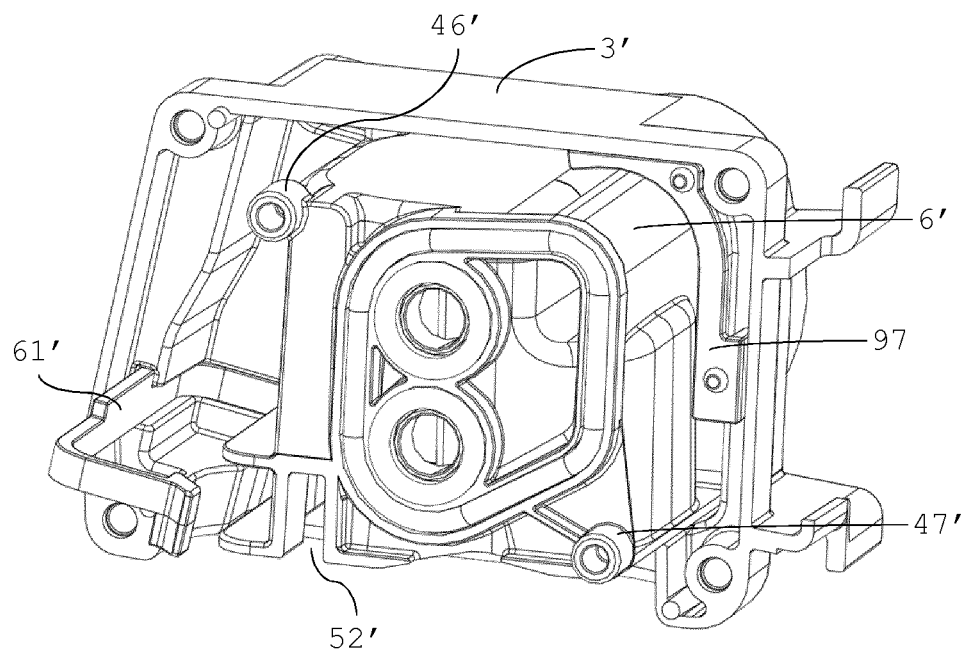
FIG. 39 is a further perspective view of the inside of the head part of the second liquid treatment apparatus.
Figure 40:
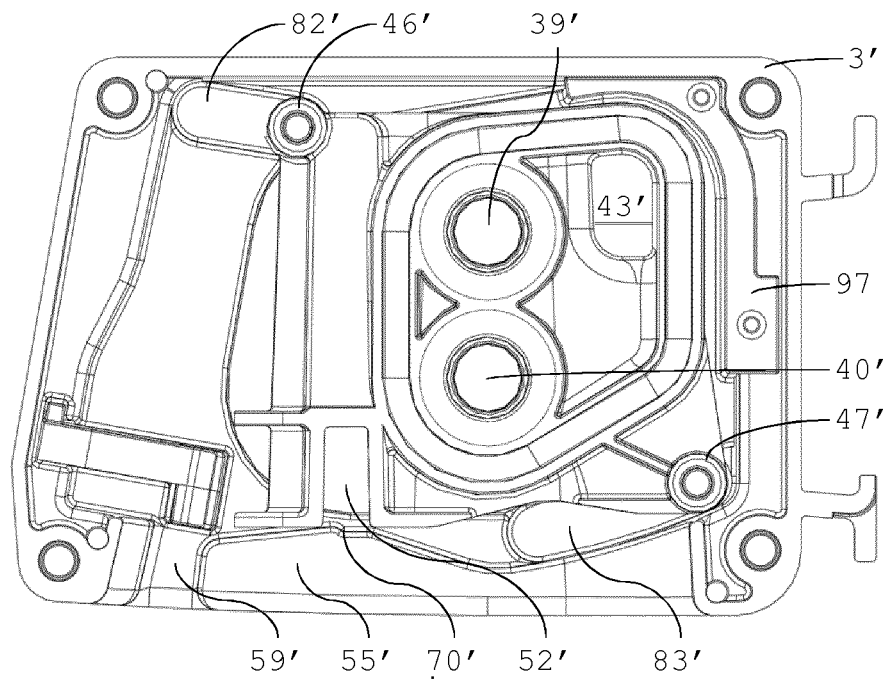
FIG. 40 is a plan view of the inside of the head part of the second liquid treatment apparatus.
Figure 41:
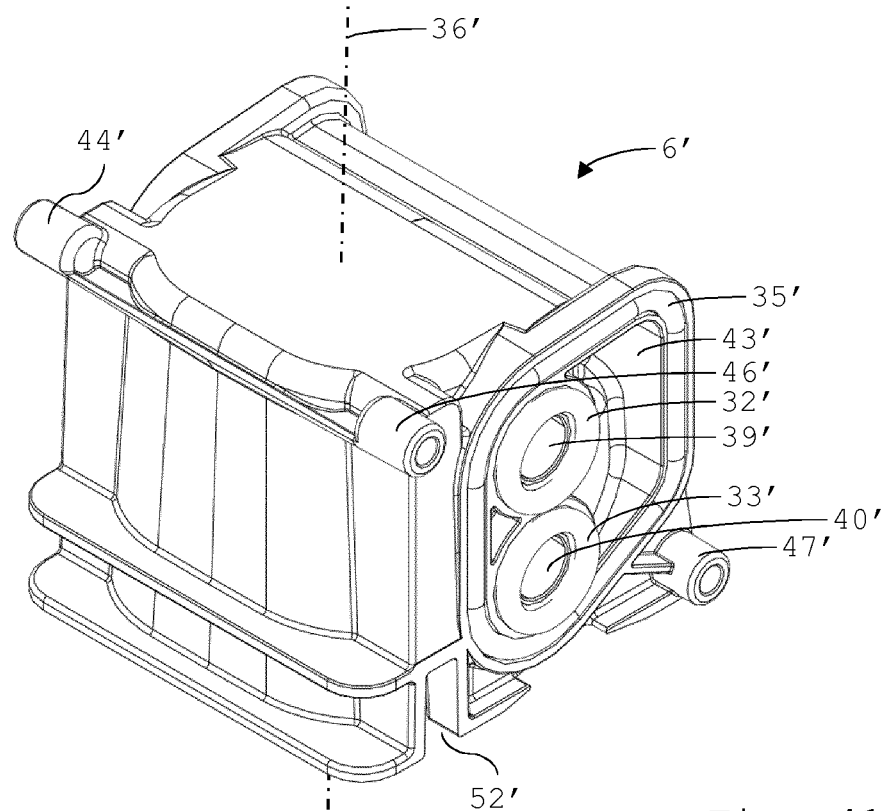
FIG. 41 is a perspective view of a receiving part comprised in the head part of the second liquid treatment apparatus.

Thus, the second embodiment includes a head part 1' and a replaceable liquid treatment cartridge, of which only a cap-shaped part 96 for closing a vessel (not shown) at its open end is shown (FIGS. 36-38). The cap-shaped part 96 includes a connecting head 7' that is substantially the same as the connecting head 7 of the cartridge 2 of the first embodiment. It differs in that it does not include the third alignment ridge 29.

Thus, the connecting head 7' can be thought of as having a reference axis 8' (FIGS. 37-38) corresponding to a longitudinal axis of the cartridge (not shown). The connecting head is provided with four cartridge ports 9'-12'. First and second ports 9', 10' (FIG. 38) are provided in a first surface section 13' facing in a direction at an angle to the cartridge axis 8' such that the connecting head 7' tapers towards the axial end of the cartridge at which the connecting head 7' is provided. Third and fourth cartridge ports 11', 12' (FIG. 37) are provided in a second surface section 14' facing in a direction at an angle to the cartridge axis 8' such that the connecting head 7' tapers towards the axial end of the cartridge at which the connecting head 7' is provided. The first and second cartridge ports 9, 10' are axially aligned, as are the third and fourth cartridge ports 11, 12. Each of the cartridge ports 9'-12' is surrounded by a respective sealing element (not shown). The first and second surface sections 13', 14' are planar.

First and second alignment ridges 19, 20 are provided adjacent the cartridge ports 9'-12'. They each extend substantially in axial direction. Lower (axial) ends 21', 22' are rounded. The alignment ridges 19, 20 are provided on curved surface sections 23', 24' facing in directions at an angle to the cartridge axis 8', so that the connecting head 7' tapers in axial direction towards the end of the cartridge at which the connecting head 7' is provided. The alignment ridges 19, 20 have first and second sections 25'-28' corresponding to those of the alignment ridges 19, 20 of the embodiment of FIGS. 1-33.

The head part 1' includes a housing comprising left and right housing parts 3', 4' joined together. The housing is suitable for mounting to a wall by means of a mounting plate (not shown) identical to the mounting plate 5 of the liquid treatment apparatus of FIGS. 1-33.

A receiving part 6' is movably journalled within the housing. A latching device 61' (FIG. 46) is of substantially similar structure to the latching device 61 of the embodiment of FIGS. 1-33. It thus includes pawls 62', 63' at the ends of arms 64', 65'. Each pawl 62', 63' is provided with a respective downward-facing facet 66, 68 for engaging the connecting head 7', more particularly the first sections 25', 26' of the alignment ridges 19', 20' and a respective facet 67', 69' for engaging the receiving part 6'.

Unlike the first embodiment, there are no screening parts.

The receiving part 6' (FIGS. 41-43) includes a body and, in this example, first to sixth sealing elements 30'-35'. The body defines a cavity for receiving the connecting head 7. It is possible to define a reference axis 36' (FIG. 41) parallel to the direction of insertion of the connecting head 7 into the cavity and thus essentially perpendicular to the mouth of the cavity. This receiving part axis 36' lies in a plane of intrinsic rotation of the receiving part 6', the axis of rotation being perpendicular thereto.

The cavity has a shape corresponding to that of the connecting head 7'. It thus tapers in axial direction towards the end opposite the mouth of the cavity.

Figure 42:
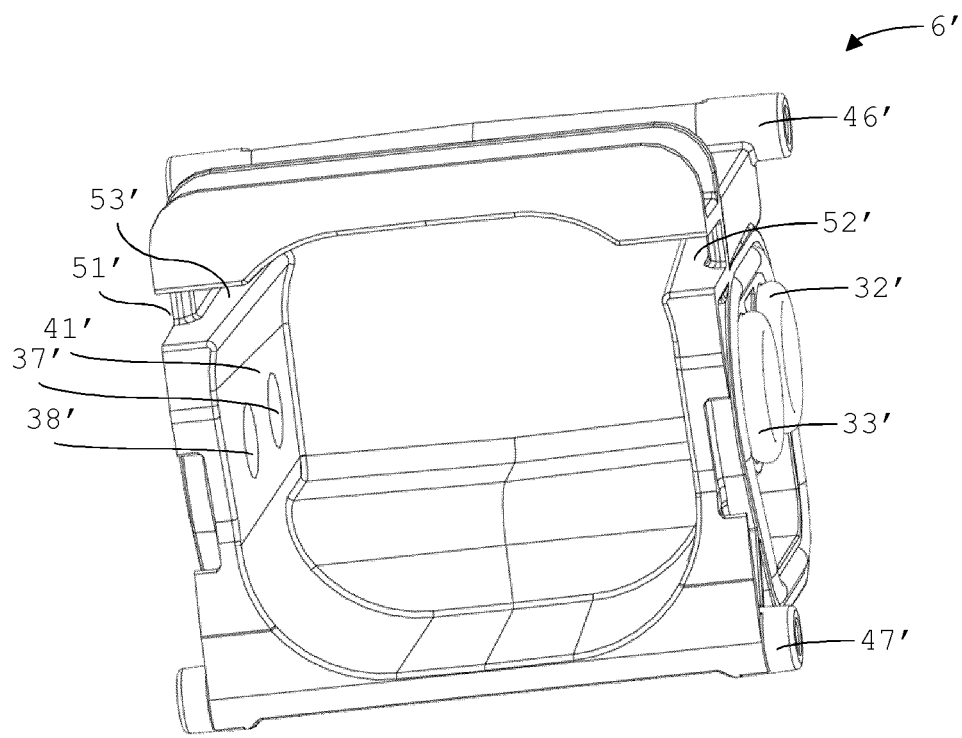
FIG. 42 is a first perspective view of an underside of the receiving part of FIG. 41.
Figure 43:
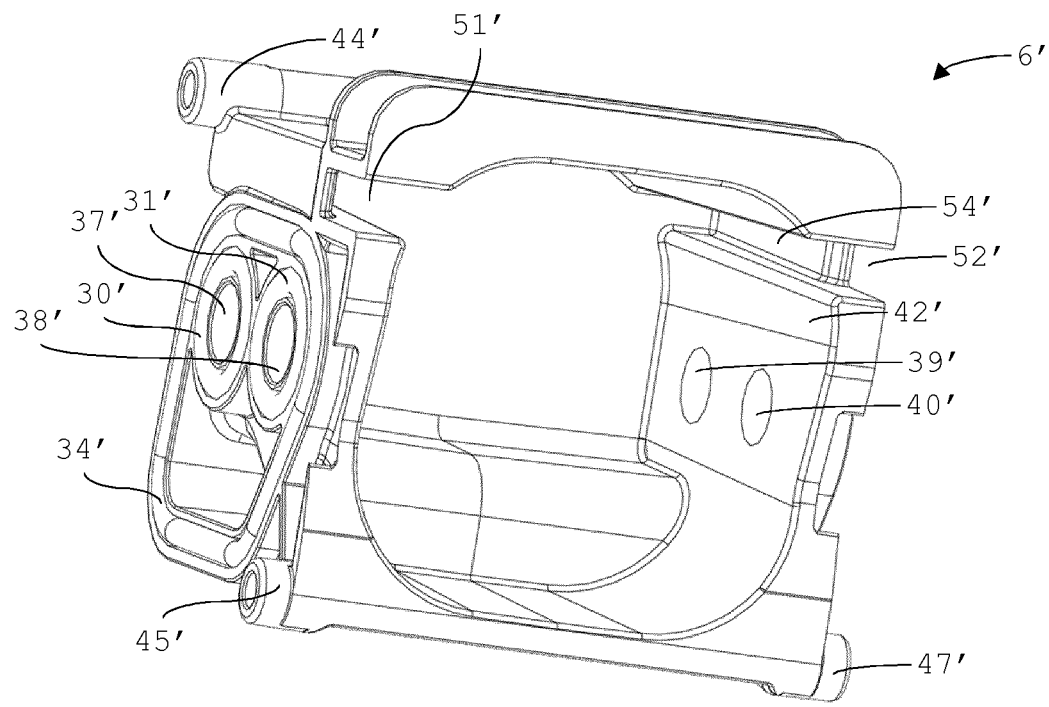
FIG. 43 is a second perspective view of the underside of the receiving part of FIGS. 41 and 42.
Figure 44:
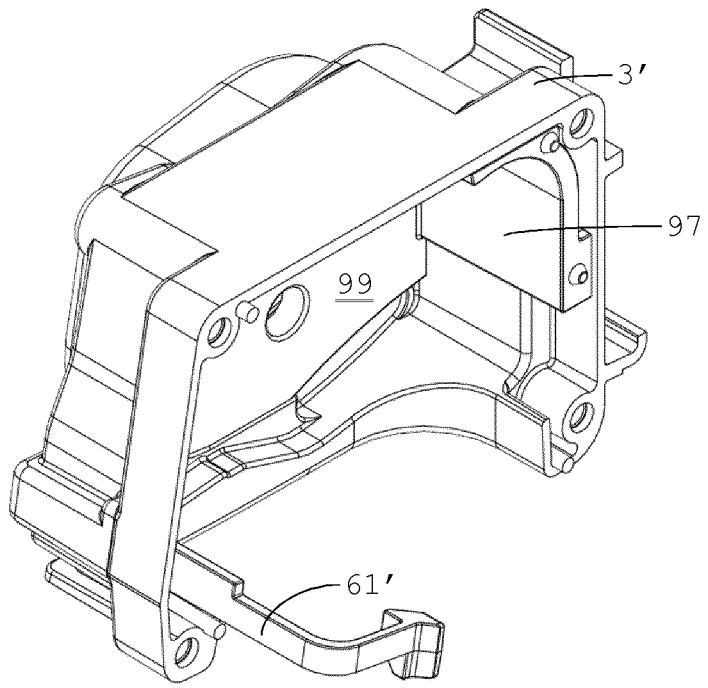
FIG. 44 is a first perspective view of a housing part and latching device comprised in the head part of the second liquid treatment apparatus.
Figure 45:
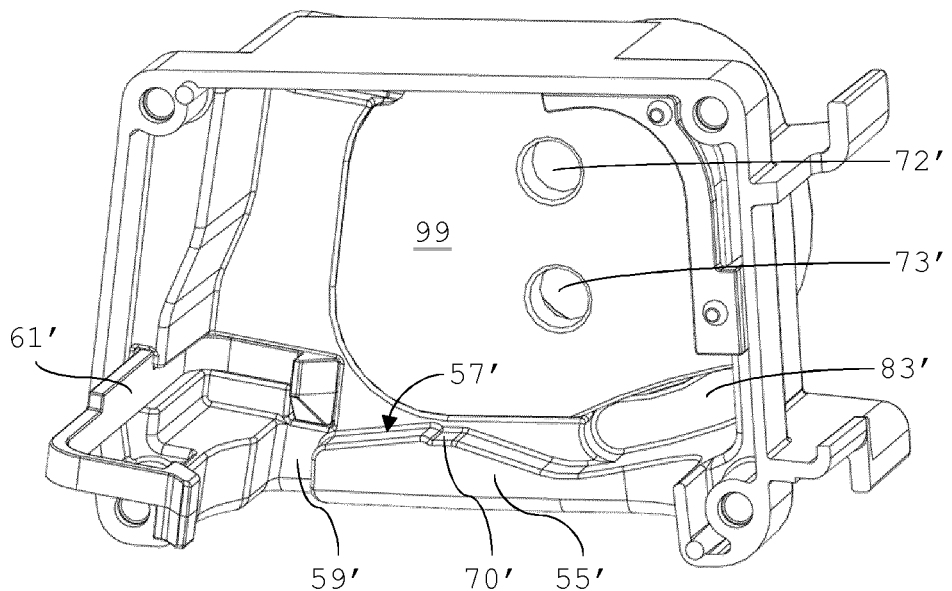
FIG. 45 is a second perspective view of the housing part and latching device of FIG. 44.
Figure 46:
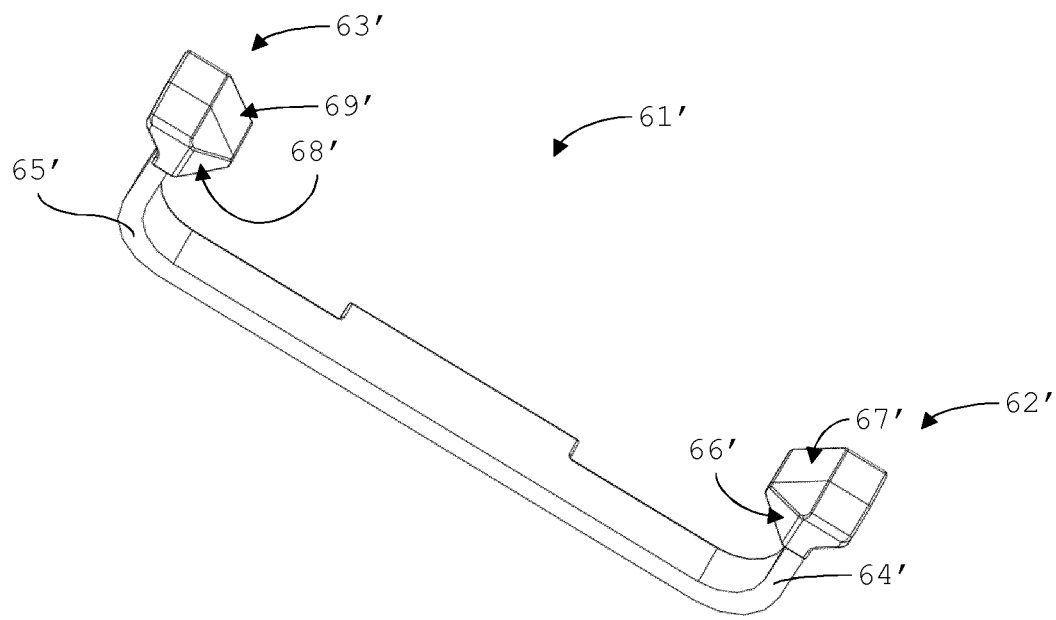
FIG. 46 is a perspective view of the latching device of FIGS. 44 and 45.
Figure 47:
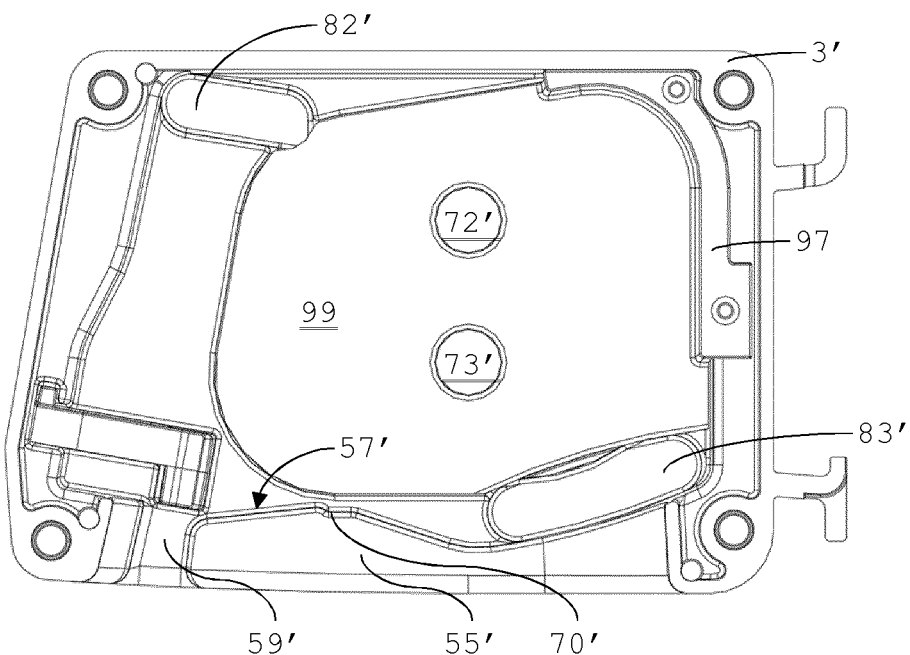
FIG. 47 is a plan view of the inside of the housing part of FIGS. 44 and 45.
Figure 48:
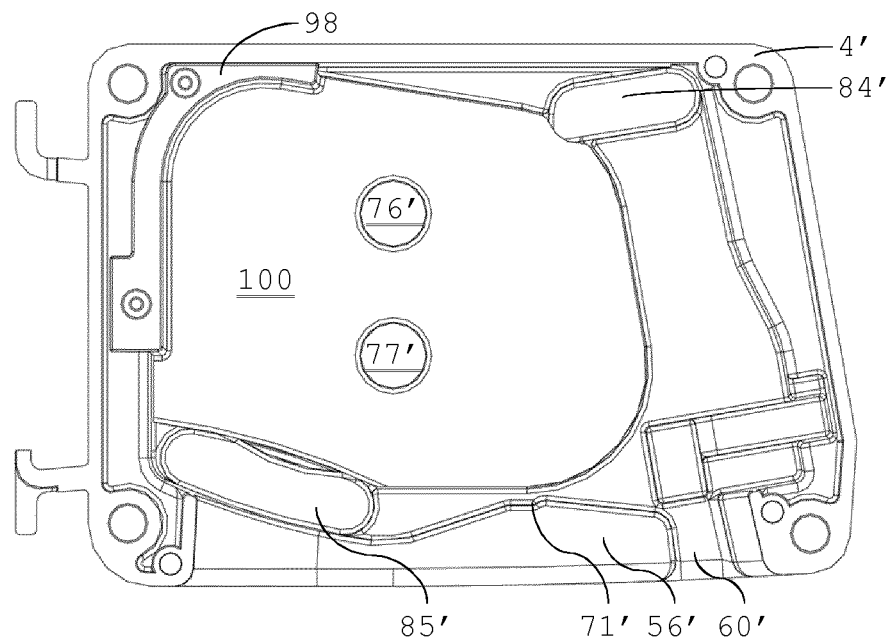
FIG. 48 is a plan view of the inside of an opposite housing part comprised in the head part of the second liquid treatment apparatus.
Figure 49:
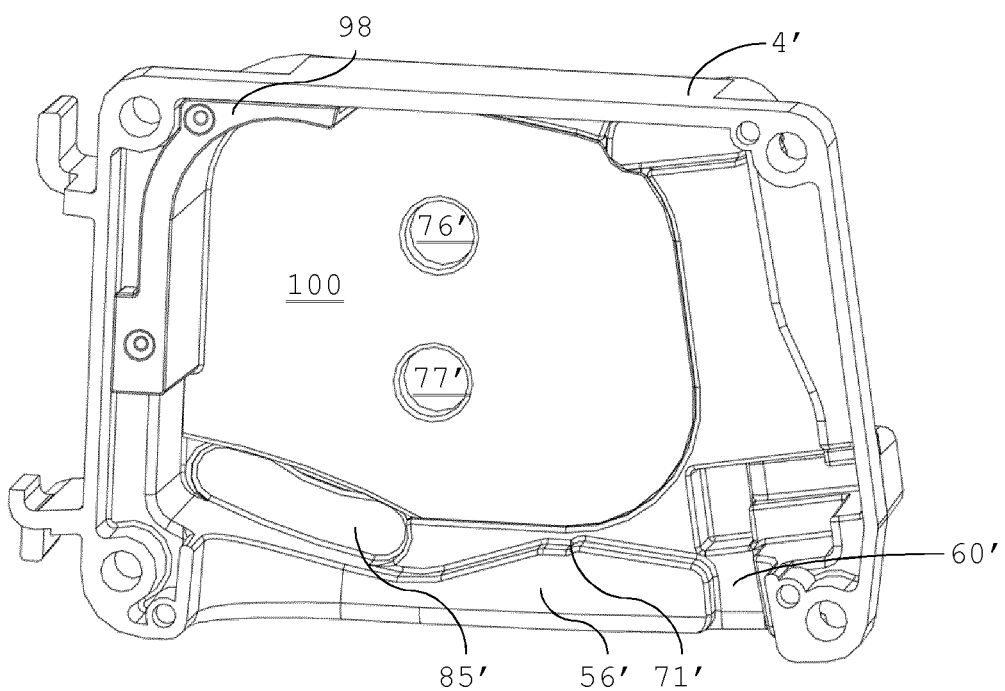
FIG. 49 is a perspective view of the inside of the housing part of FIG. 48.

Liquid-permeable ports 37'-40' are provided in opposing side walls defining the cavity. First and second ports 37', 38' are provided in a first side wall section 41' (FIGS. 42-43). Third and fourth ports 39', 40' are provided in a second side wall section 42'. The first and second side wall sections 41', 42' are essentially planar.

A bypass channel 43' (FIG. 40) is defined in the body of the receiving part 6. It is narrower than the bypass channel 43 of the embodiment of FIGS. 1-33 for reasons that will be explained. The bypass channel 43' extends from one side of the receiving part 6' to an opposite side and bypasses the cavity. Fifth and sixth receiving part sealing elements 34', 35' each surround both an opening of the bypass channel 43' and two of the ports 37'-40' with their surrounding sealing elements 30'-33'. This arrangement allows the receiving part 6 to function as the valve member of a valve mechanism structured similarly to a sliding gate valve.

However, in contrast to the embodiment of FIGS. 1-33, the bypass channel 43' is closed in the second position. It merely provides for liquid communication between upper and lower main ports 72'-77' in the first position.

Guide protrusions 44'-47' (FIGS. 41-43) are defined by the body of the receiving part 6'. Two guide protrusions 44'-47' are provided on either of opposite sides of the receiving part 6'. Each of the guide protrusions 44'-47' is aligned with a guide protrusion 44'-47' on the opposite side of the receiving part 6'.

First and second alignment grooves 48', 49' (FIGS. 42,43) are for receiving the first and second alignment ridges 19', 20' when the connecting head 7' is inserted into the cavity of the receiving part 6'. The alignment grooves 48', 49' are at least open towards the cavity and in this example also at axial ends adjacent a mouth of the cavity. First (lower) sections 51', 52' extend through the side wall sections of the receiving part 6' in which they are provided to form slits through these side wall sections. They are provided at the axial ends proximal to the mouth of the cavity. Second (upper) alignment groove sections 53', 54' are shaped as slots in the side wall sections in which they are provided. These sections 53', 54' have depths smaller than the thickness of the side wall sections in which they are provided. They are located at the axial ends distal to the mouth of the cavity. The depth of each of the second alignment groove sections 53', 54' increases in axial direction towards the axial end distal to the mouth of the cavity, in order to compensate for the taper of the cavity.

The left and right housing parts 3', 4' are provided with ledges 55', 56' (FIGS. 45 and 47-49) defining support surfaces 57', 58' for supporting the inserted connecting head 7' by the rounded ends 21', 22' of the first and second alignment ridges 19', 20' after the connecting head 7' has been fully inserted into the cavity in the first position of the receiving part 6' and then moved some way towards the second position. The ledges 55', 56' adjoin gaps 59', 60' having a width equal to at least the width of the first and second alignment ridges 19', 20'. The ledges 55', 56' define detents 70', 71' that are aligned with the alignment grooves 48', 49' in the second position of the receiving part 6'.

The main ports 72', 73', 76', 77' are defined by left and right screening inserts 97, 98 sealingly placed against the inside surfaces of the left and right housing parts 3', 4'. The screening inserts 97, 98 have surfaces 99, 100 that co-operate with the sealing elements 30'-35' of the receiving part 6'. By contrast, the guide protrusions 44'-47' of the receiving part 6' are guided for movement in guides for receiving the guide protrusions 44'-47'. Each of the guides is at least partly defined by one of guide grooves 82'-85' in the left and right housing parts 3', 4'. First and third guides are defined only by first and third guide grooves 82', 84'. Second and fourth guides are defined partly by second and fourth guide grooves 83', 85' (i.e. the lower guide groove in each of the left and right second housing parts 3', 4') and partly by lower edges of the screening inserts 97, 98. Each of the second and fourth guides has opposite edges for guiding a protrusion 45', 47' between the first and second positions, wherein the opposite edges have at least central sections with different respective curvatures. The second and fourth guide grooves 83', 85' are wider in a central section than at their ends. A different edge guides the inserted guide protrusion 45', 47' on its way from the first to the second position than on its way from the second to the first position. This facilitates movement of the receiving part between the first and second positions without jamming. As in the first embodiment of FIGS. 1-33, this movement is a combination of displacement of the receiving part 6' and internal rotation in a plane parallel to the direction of displacement. The angle of rotation is likewise relatively small, e.g. below 20°.

The invention is not limited to the embodiments described above, which may be varied within the scope of the accompanying claims. For example there may be fewer than four ports in the receiving part 6 and connecting head 7, e.g. three or two, and thus fewer than four main ports 72, 73, 76, 77.

LIST OF REFERENCE NUMERALS

1, 1'—head part
2—cartridge
3, 3'—left housing part
4, 4'—right housing part
5—mounting plate
6, 6'—receiving part
7, 7'—connecting head
8, 8'—cartridge axis
9, 9'—first cartridge port
10, 10'—second cartridge port
11, 11'—third cartridge port
12, 12'—fourth cartridge port 13, 13'—first connecting head surface section
14, 14'—second connecting head surface section
15—first cartridge port sealing element
16—second cartridge port sealing element
17—third cartridge port sealing element
18—fourth cartridge port sealing element
19, 19'—first alignment ridge
20, 20'—second alignment ridge
21, 21'—rounded end of first alignment ridge
22, 22'—rounded end of second alignment ridge
23, 23'—first curved surface section
24, 24'—second curved surface section
25, 25'—lower section of first alignment ridge
26, 26'—lower section of second alignment ridge
27, 27'—upper section of first alignment ridge
28, 28'—upper section of second alignment ridge
29—third alignment ridge
30, 30'—first receiving part sealing element
31, 31'—second receiving part sealing element
32, 32'—third receiving part sealing element
33, 33'—fourth receiving part sealing element
34, 34'—fifth receiving part sealing element
35, 35'—sixth receiving part sealing element
36, 36'—receiving part axis
37, 37'—first receiving part port
38, 38'—second receiving part port
39, 39'—third receiving part port
40, 40'—fourth receiving part port
41, 41'—first receiving part side wall section
42, 42'—second receiving part side wall section
43, 43'—bypass channel
44, 44'—first guide protrusion
45, 45'—second guide protrusion
46, 46'—third guide protrusion
47, 47'—fourth guide protrusion
48, 48'—first alignment groove
49, 49'—second alignment groove
50—third alignment groove
51, 51'—lower section of first alignment groove
52, 52'—lower section of second alignment groove
53, 53'—upper section of first alignment groove
54, 54'—upper section of second alignment groove
55, 55'—left housing part ledge
56, 56'—right housing part ledge
57, 57'—left housing part support surface
58, 58'—right housing part support surface
59, 59'—gap adjoining left housing part ledge
60, 60'—gap adjoining right housing part ledge
61, 61'—latching device
62, 62'—first pawl
63, 63'—second pawl
64, 64'—first arm
65, 65'—second arm
66, 66'—facet on first pawl facing downwards
67, 67'—facet on first pawl for engaging receiving part
68, 68'—facet on second pawl facing downwards
69, 69'—facet on second pawl for engaging receiving part
70, 70'—left housing part detent
71, 71'—right housing part detent
72, 72'—upper main port in left housing part
73, 73'—lower main port in left housing part
74—bypass port in left housing part
75—connector interface in left housing part
76, 76'—upper main port in right housing part
77, 77'—lower main port in right housing part
78—bypass port in right housing part
79—connector interface in right housing part
80—interior surface of left housing part
81—interior surface of right housing part
82, 82'—first guide groove
83, 83'—second guide groove
84, 84'—third guide groove
85, 85'—fourth guide groove
86—first screening part
87—second screening part
88—first screening part guide protrusion (left housing part)
89—first screening part guide protrusion (right housing part)
90—guide groove for first screening part in left housing part
91—guide groove for first screening part in right housing part
92—second screening part guide protrusion (left housing part)
93—second screening part guide protrusion (right housing part)
94—guide groove for second screening part—in left housing part
95—guide groove for second screening part in right housing part
96—cap-shaped cartridge part
97—left screening insert
98—right screening insert
99—left screening insert surface
100—right screening insert surface

The invention claimed is:

1. A device for forming a liquid treatment apparatus when combined with a replaceable liquid treatment cartridge, the device comprising:
a main part; and
a receiving part comprising a cavity for receiving a connecting head of the replaceable liquid treatment cartridge having at least one port in liquid communication with an interior of the replaceable liquid treatment cartridge such that the at least one port(s) of the connecting head are in sealed liquid communication with corresponding respective ports of the receiving part for transfer of liquid between the device and the replaceable liquid treatment cartridge to allow the replaceable liquid treatment cartridge to effect a liquid treatment,
wherein the receiving part is journalled for movement between a first and a second position with respect to the main part whilst the connecting head is inserted in the cavity,
wherein the connecting head is insertable into and retractable from the cavity in the first position,
wherein the replaceable liquid treatment cartridge is lockable to the device by at least moving the receiving part with the inserted connecting head into the second position, and
wherein the movement comprises a component corresponding to an intrinsic rotation in a plane parallel to a direction of insertion about an axis of rotation, and
wherein the movement further comprises at least a component corresponding to a displacement of the entire receiving part and thus of the axis of rotation relative to the main part.

2. The device according to claim 1,
wherein the component corresponding to a displacement of the receiving part relative to the main part is a component corresponding to a displacement of each part of a body forming the receiving part.

3. The device according to claim 1,
wherein the receiving part has an axis corresponding to a direction of insertion, and wherein the displacement is in a direction parallel to a plane of rotation and having at least a component perpendicular to the axis corresponding to the direction of insertion as oriented in the second position.

4. The device according to claim 1,
wherein the main part comprises at least one of at least one inlet and at least one outlet, at least one of which is placeable in liquid communication with at least respective one of the ports of the receiving part in at least the second position.

5. The device according to claim 4, further comprising a valve mechanism for interrupting the liquid communication in at least the first position.

6. The device according to claim 5,
wherein the receiving part is arranged to function as a movable valve member of the valve mechanism,
wherein at least one of the at least one ports of the receiving part in liquid communication with the cavity is aligned in the second position with at least one of respective ports of the main part that is at least placeable in liquid communication with one of the at least one inlets and outlets, and
wherein, of each pair of ports of the receiving part and the main part aligned in the second position, at least one of the ports of the receiving part and the at least one of the respective ports of the main part is blocked by a wall of the other of the receiving part and the main part in the first position.

7. The device according to claim 6,
wherein the receiving part comprises a plurality of ports in liquid communication with the cavity and aligned in the second position with at least one respective port of the main part that is at least placeable in liquid communication with one of the at least one inlets and outlets,
wherein a channel is formed in the receiving part, and
wherein the channel is arranged, in at least the first position, to place the at least one of the ports of the main part aligned with a respective one of the plurality of ports of the receiving part in the second position in sealed liquid communication with at least one other of the ports of the main part aligned with a respective one of the plurality of ports of the receiving part in the second position.

8. The device according to claim 1,
wherein the receiving part comprises at least one groove for receiving at least one alignment part on the connecting head when the connecting head is inserted into the cavity, and
wherein the groove is provided in a section of a wall having a surface at least partly delimiting the cavity laterally with respect to an axis corresponding to the direction of insertion.

9. The device according to claim 1,
wherein the main part comprises at least one section defining a support surface for supporting a protruding part of the replaceable liquid treatment cartridge during movement of the receiving part between the first and second positions with the connecting head inserted.

10. The device according to claim 9,
wherein at least one of the at least one sections further defines at least one detent for the protruding part of the replaceable liquid treatment cartridge.

11. The device according to claim 1,
further comprising at least one latching device for retaining the receiving part in the first position.

12. A liquid treatment apparatus comprising the replaceable liquid treatment cartridge and a head part comprising at least one device according to claim 1.

13. The liquid treatment apparatus according to claim 12,
wherein the replaceable liquid treatment cartridge has a cartridge axis, essentially aligned with the direction of insertion when the connecting head is inserted in the cavity,
wherein the connecting head and receiving part are provided with at least one set of alignment parts for axially aligning the cartridge axis with an axis of the receiving part corresponding to the direction of insertion, and
wherein each set comprises a groove and at least one protruding alignment part for insertion into the groove when the connecting head is inserted into the cavity.

14. The liquid treatment apparatus according to claim 12,
wherein the replaceable liquid treatment cartridge has a cartridge axis, essentially aligned with the direction of insertion when the connecting head is inserted in the cavity, and
wherein the liquid treatment cartridge comprises at least one laterally protruding part for support by a respective support surface provided by the main part of the device during movement of the receiving part between the first and second positions with the connecting head inserted.

15. A method of attaching a replaceable liquid treatment cartridge to a head part of a liquid treatment apparatus,
the head part comprising at least one device that comprises:
a main part; and
a receiving part comprising at least one cavity,
wherein the replaceable liquid treatment cartridge comprises a respective connecting head corresponding to each available cavity from the at least one cavity, having at least one port in liquid communication with an interior of the replaceable liquid treatment cartridge, the method comprising:
inserting each respective connecting head, that individually corresponds to each available cavity, into a respective cavity from the at least one cavity such that the at least one port(s) of the respective connecting head or heads are in sealed liquid communication with corresponding respective ports of the receiving part,
wherein at least one connecting head is inserted in a first position of the receiving part with respect to the main part, and
moving the receiving part with the inserted the at least one connecting head into a second position with respect to the main part by at least swivelling the replaceable liquid treatment cartridge about an axis of rotation, and
wherein the receiving part is moved into the second position by also displacing the entire receiving part and thus the axis of rotation relative to the main part.

16. The method of claim 15, wherein the main part comprises at least one of at least one inlet and at least one outlet, at least one of which is placeable in liquid communication with at least respective one of the ports of the receiving part in at least the second position.

17. The method of claim 15, wherein the main part comprises at least one section defining a support surface for supporting a protruding part of the replaceable liquid treatment cartridge during movement of the receiving part between the first and second positions with the at least one connecting head inserted.

18. The method of claim 15, further comprising at least one latching device for retaining the receiving part in the first position.

* * * * *